(12) United States Patent
Asada

(10) Patent No.: US 6,700,353 B2
(45) Date of Patent: Mar. 2, 2004

(54) BATTERY CHARGING SYSTEM AND VEHICLE GENERATOR CONTROL SYSTEM

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 71 days.

(21) Appl. No.: 10/109,683

(22) Filed: Apr. 1, 2002

(65) Prior Publication Data

US 2002/0149347 A1 Oct. 17, 2002

(30) Foreign Application Priority Data

Apr. 16, 2001 (JP) ........................................ 2001-116680
Apr. 16, 2001 (JP) ........................................ 2001-116681
Apr. 16, 2001 (JP) ........................................ 2001-116682

(51) Int. Cl.$^7$ ............................. H02H 7/06; H02P 11/00; H02P 9/00
(52) U.S. Cl. ............................. 322/28; 322/29; 322/20; 322/19; 322/17
(58) Field of Search ............................. 322/29, 28, 20, 322/19, 17

(56) References Cited

U.S. PATENT DOCUMENTS

| | | | | |
|---|---|---|---|---|
| 3,673,489 A | * | 6/1972 | Riff | 322/28 |
| 4,275,344 A | * | 6/1981 | Mori et al. | 322/28 |
| 4,320,308 A | * | 3/1982 | Iwasaki | 307/106 |
| 4,362,982 A | * | 12/1982 | Akita et al. | 320/123 |
| 4,634,954 A | * | 1/1987 | Kato et al. | 322/28 |
| 4,641,079 A | * | 2/1987 | Kato et al. | 320/123 |
| 4,937,514 A | * | 6/1990 | Iwatani | 322/33 |
| 4,973,896 A | * | 11/1990 | Shiga et al. | 322/28 |
| 5,157,321 A | * | 10/1992 | Kato et al. | 322/28 |
| 5,266,882 A | * | 11/1993 | Morishita | 322/28 |
| 5,352,971 A | * | 10/1994 | Nishimura | 322/27 |
| 5,483,146 A | * | 1/1996 | Schultz et al. | 322/7 |
| 5,561,363 A | * | 10/1996 | Mashino et al. | 322/25 |
| 5,581,172 A | * | 12/1996 | Iwatani et al. | 322/28 |
| 5,629,606 A | * | 5/1997 | Asada | 322/28 |
| 5,648,705 A | * | 7/1997 | Sitar et al. | 318/145 |
| 5,663,631 A | * | 9/1997 | Kajiura et al. | 322/29 |
| 5,686,819 A | * | 11/1997 | Iwatani et al. | 322/25 |
| 5,719,485 A | * | 2/1998 | Asada | 322/28 |
| 5,731,689 A | * | 3/1998 | Sato | 322/25 |
| 5,754,030 A | * | 5/1998 | Maehara et al. | 322/19 |
| 5,793,167 A | * | 8/1998 | Liang et al. | 318/141 |
| 5,923,151 A | * | 7/1999 | Satoh | 322/28 |
| 6,005,372 A | * | 12/1999 | Kouwa et al. | 322/25 |
| 6,014,016 A | * | 1/2000 | Maruyama et al. | 322/28 |
| 6,239,582 B1 | * | 5/2001 | Buzan et al. | 322/20 |
| 6,271,649 B1 | * | 8/2001 | Iwatani | 322/29 |
| 6,384,551 B1 | * | 5/2002 | Watanabe | 318/139 |
| 6,433,519 B2 | * | 8/2002 | Taniguchi et al. | 322/28 |
| 6,555,993 B2 | * | 4/2003 | Taniguchi et al. | 322/28 |

FOREIGN PATENT DOCUMENTS

JP   B2 3070788   5/2000

\* cited by examiner

Primary Examiner—Nicholas Ponomarenko
Assistant Examiner—Pedro J. Cuevas
(74) Attorney, Agent, or Firm—Oliff & Berridge, PLC

(57) ABSTRACT

A battery charging system is provided for an excellent engine starting. The battery charging system includes a generator control unit for controlling output voltage of the generator and a commanding unit for providing a command pulse signal. The generator control unit includes a command pulse signal's duty-ratio detecting circuit, a generator output power limiting circuit, a voltage regulator and an activation circuit for activating the output power limiting circuit when the duty-ratio falls within a predetermined ratio range.

25 Claims, 21 Drawing Sheets

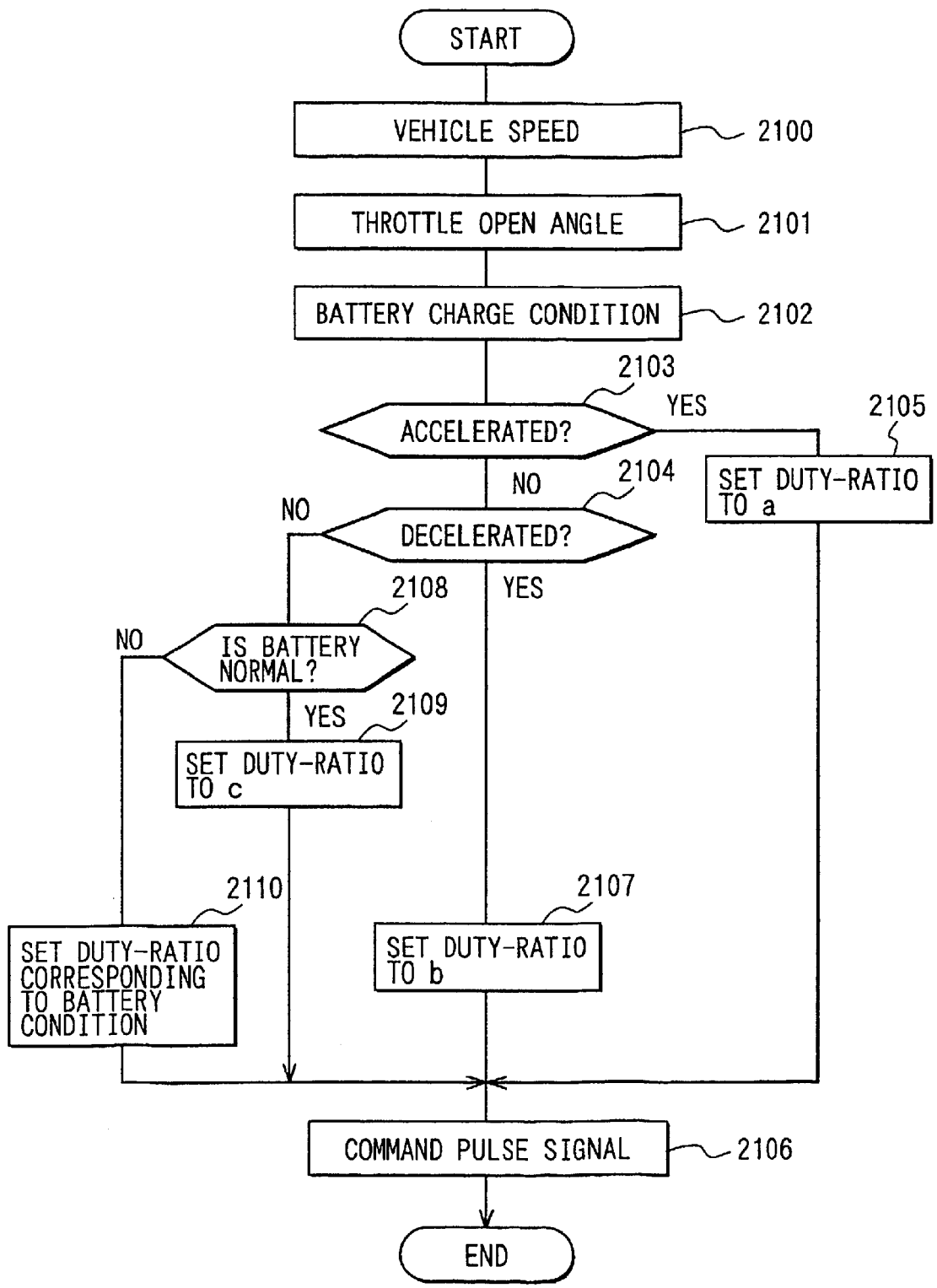

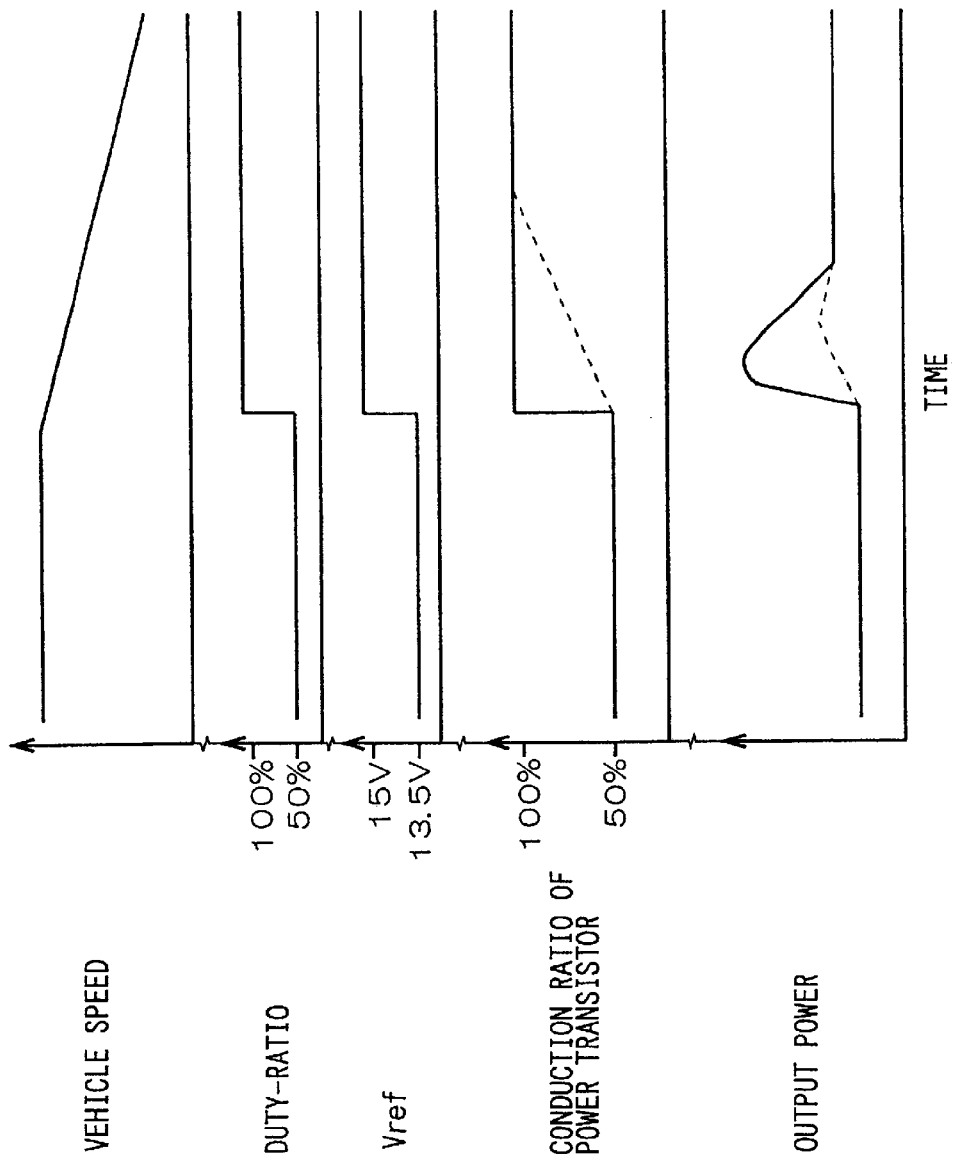

BATTERY CHARGING SYSTEM AND VEHICLE GENERATOR CONTROL SYSTEM

CROSS REFERENCE TO RELATED APPLICATION

The present application is based on and claims priority from the following Japanese Patent Applications: 2001-116680, filed Apr. 16, 2001; 2001-116681, filed Apr. 16, 2001; and 2001-116682, filed Apr. 16, 2001; the content of which are incorporated herein by reference.

BACKGROUND OF THE INVENTION

1. Field of the Invention

The present invention relates to a battery charging system that includes a vehicle generator mounted in a vehicle, such as a passenger car or a truck.

2. Description of the Related Art

Recently, the idling speed of vehicle engines has been lowered, while vehicle electric loads are increased. In order to cope with the above-stated tendency, it has been proposed that the output voltage of generators is controlled according to various conditions such as vehicle running condition, engine operating condition, battery charge condition, electric load condition or the like. JP-B2-3070788 discloses such a generator control unit, in which a duty ratio signal that corresponds to a target voltage is provided by an ECU to control an IC regulator, thereby regulating the output voltage of a vehicle generator according to various vehicle conditions.

For example, the output voltage is controlled to be lower to reduce the output power of the generator, such as 12 V, when the vehicle is accelerated, thereby reducing fuel consumption. On the other hand, the output voltage is controlled to be higher to increase the output power of the generator, such as 15 V, when the vehicle is decelerated, thereby increasing the amount of electric energy to be charged to a battery.

When an engine is started by a starter at a cold temperature, a catalyst may not be fully activated if the torque of the vehicle generator in operation becomes too much for the engine. As a result, a considerable amount of unburned fuel may be discharged just after the engine is started, especially at a very low temperature. If the output voltage of the vehicle generator is lowered by the generator control unit according to the disclosure of the above publication during engine is being started, it is difficult to control the output power of the generator because a large amount of battery current is supplied to the starter and the terminal voltage of the battery becomes very low.

In order to start the engine even in the above condition, a specific circuit for limiting the output power of the vehicle generator may be mounted in the vehicle generator. However, such a specific circuit limits the output power of the vehicle generator although ambient temperature or engine coolant temperature is high enough for the engine start operation. This may unnecessarily reduce the engine load even at a normal temperature, thereby causing racing of the engine that may annoy a driver.

Further, although the target voltage is set to a maximum voltage, the output voltage changes from 16 V to 14.4 V if the duty ratio changes a little higher. Therefore, it is necessary to detect the temperature of the battery in order to accurately control the output voltage. That is, a specific temperature sensor has to be mounted where the battery temperature can be detected.

The generator control system disclosed in JP-B2-3070788 gradually increases the output power of the vehicle generator to prevent the engine operation from becoming unstable. However, if the output voltage of the vehicle generator is intended to increase when the vehicle is decelerated, in order to convert the kinetic energy of the vehicle into electric power to be charged to the battery 3, such a generator control system may hamper such energy recovery.

SUMMARY OF THE INVENTION

Therefore, the present invention has been made in view of the above problems.

It is a main object of the invention to provide an improved battery charging system and a generator control unit for an automotive vehicle that ensure complete engine starting, reduce fuel consumption of the engine of the vehicle and prevent the fuel from being unburned.

Another object of the invention is to provide an improved generator control unit of the above-stated battery charging system.

In a battery charging system that is used with a generator according to a main feature of the invention, a generator control unit is comprised of a duty-ratio detecting means for detecting a duty ratio of a command pulse signal, an output power limiting circuit for limiting the output power of the generator, a voltage regulator for regulating the output voltage of the generator to a voltage proportional to the duty-ratio of the command pulse signal and activation means for activating the output power limiting circuit to limit the output power of the generator when the duty-ratio falls within a predetermined range.

Accordingly, a vehicle engine can be started under such an excellent condition that fuel consumption can be reduced and, also, unburned fuel can be prevented from discharging from the vehicle engine. Moreover, it is not necessary to provide two kinds of power control units for limiting generator's output power.

It is preferable that the predetermined range includes a duty-ratio at which the output voltage is regulated to be minimum. It is also preferable that the generator control unit includes a generator rotation speed detecting circuit. With the generator rotation speed detecting circuit, the activation means activates the output power limiting circuit to limit output power of the generator if the duty ratio falls in the predetermined ratio range and in a predetermined speed range.

It is preferable that the output power is limited by limiting field current supplied to the field coil of the vehicle generator. For this purpose, the voltage regulator may include a power transistor for controlling the field current. Preferably, the output power limiting circuit controls the output power by controlling conduction ratio of the power transistor. The output power limiting circuit may also limit the peak voltage of one of the phase winding within battery voltage when the battery is disconnected or when the engine is started by a starter.

Preferably, the generator control unit includes a load responsive control unit for limiting the field current when the generator is connected to an electric load and when the activation means switches the output power limiting circuit from its activating state to deactivating state.

Another object of the invention is to provide an improved battery charging system that does not necessitate a specific hardware for transmitting the command pulse signal.

In a battery charging system having a generator control unit according to another feature of the invention, the generator control unit is comprised of a duty-ratio detecting means for detecting a duty ratio of a command pulse signal transmitted from outside, a reference voltage generating means for providing reference voltage that is approximately proportional to the duty-ratio between a maximum value and a minimum value of the duty ratio and is fixed at one of the maximum and minimum values, and a voltage regulator including means for comparing the reference voltage with terminal voltage of a battery.

The reference voltage generating means is preferably disposed where ambient temperature changes relative to temperature of the battery so that the reference voltage can be set according to the ambient temperature when the duty-ratio is in a range near the maximum value or the minimum value.

It is preferable that an outside control unit (ECU) for generating the command pulse signal is comprised of a CPU for calculating the duty-ratio of the command pulse signal according to at least one of a battery charge condition, a vehicle speed and a throttle valve position in synchronism with a clock signal, a pulse signal generator including a switching circuit and a register for holding on-off state of the switching circuit. Thus, content of the register is changed by the means for calculating a duty-ratio in synchronism with said clock signal to change said on-off state of said switching circuit, thereby generating said command pulse signal.

It is also preferable that the command pulse signal has a cycle time that is a multiple of a cycle time of the clock signal and is shorter than a time constant of the vehicle generator.

It is also preferable that the reference voltage generating means is disposed where ambient temperature changes relative to temperature of the battery so that the reference voltage can be set according to the ambient temperature when the duty-ratio is in a predetermined range. In this case, the CPU sets a duty-ratio of the command pulse signal at a minimum value so that the reference voltage can be minimum when detected that the vehicle is accelerated, to a maximum value so that the reference voltage can be maximum when detected that the vehicle is decelerated and to a value in the predetermined range when detected that the vehicle is not accelerated or decelerated and that the battery is in a state of being charged.

Another object of the invention is to provide an improved battery charging system and generator control unit that are effective to stabilize engine operation and to reduce fuel consumption of the engine.

In a battery charging system including a generator control unit according to another feature of the invention, the generator control unit is comprised of a duty-ratio detecting means for detecting a duty-ratio of a command pulse signal, a load responsive control circuit for limiting increase of current supplied to the field coil of the generator, a voltage regulator for controlling output voltage of the generator to be proportional to the duty-ratio and means for disabling the load responsive control circuit from controlling voltage increase if the duty ratio is in a predetermined range.

Therefore, the output power can be controlled both for stabilizing rotation of the engine and for converting kinetic energy of the vehicle into electric energy to be charged into a battery.

It is preferable that the predetermined range includes a duty-ratio that makes the voltage regulator control the output voltage of the generator at a maximum voltage (e.g. 15 V).

An outside control unit (ECU) for generating the command pulse signal may be comprised of a CPU for calculating the duty-ratio of the command pulse signal according to one of a battery charge condition, such as a vehicle speed or a throttle valve position, and a pulse signal generator including a switching circuit and a register for holding on-off state of the switching circuit. The content of the register is changed in synchronism with the clock signal, so that the on-off state of the switching circuit is changed to generate the command pulse signal. It is preferable that the command pulse signal has a cycle time that is a multiple of a cycle time of the clock signal and is shorter than a time constant of the vehicle generator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 22 is a flow diagram of the battery charging system according to the third embodiment; and FIG. 23 is a graph showing timings of changes in the reference voltage, conduction ratio of the power transistor and the output power of the vehicle generator relative to the vehicle speed and the duty-ratio of the command pulse signal.

DETAILED DESCRIPTION OF THE PREFERRED EMBODIMENTS

Figure 1:
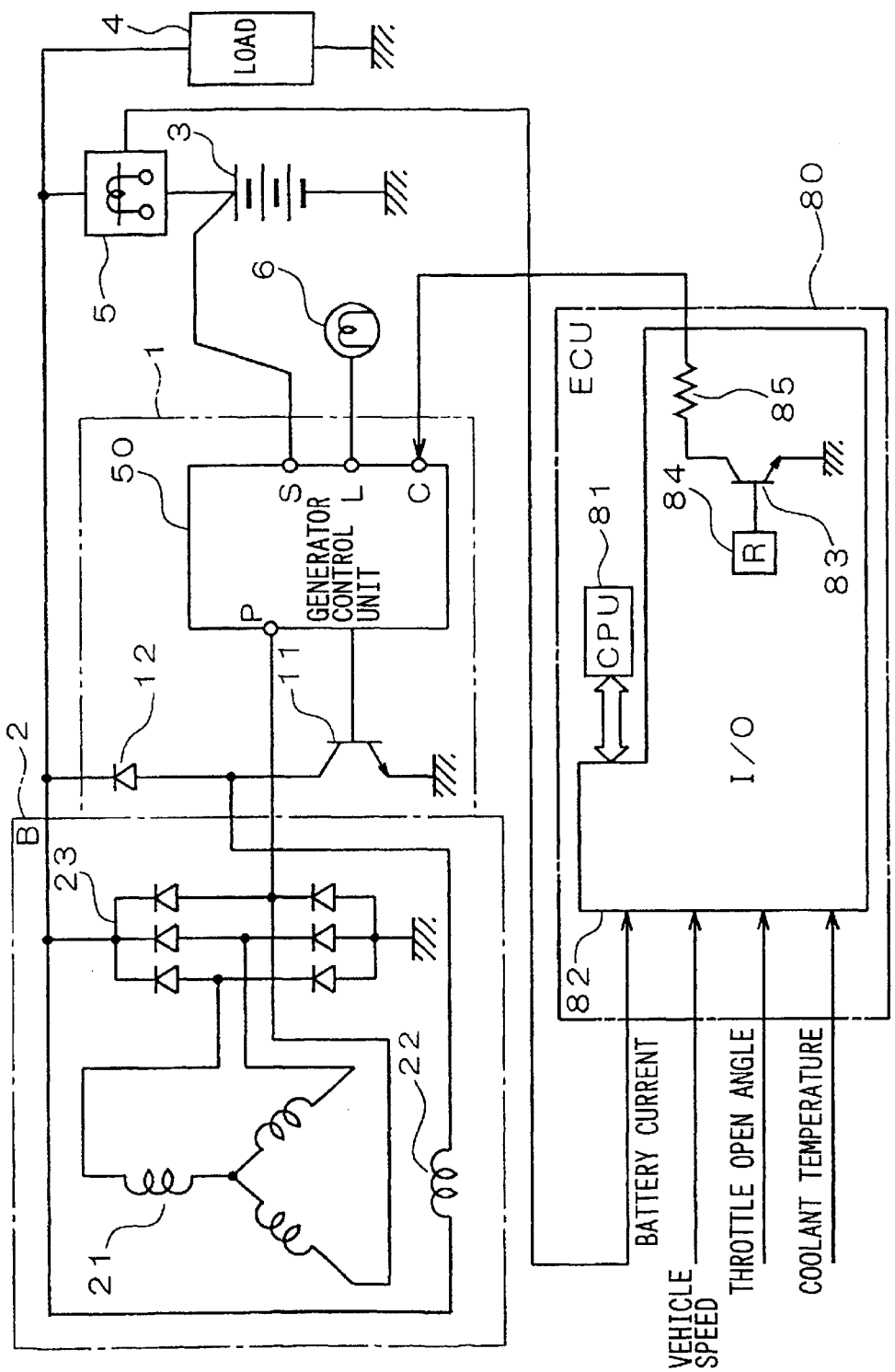
FIG. 1 is a circuit diagram of a battery charging system according to the first embodiment of the invention.

A battery charging system according to the first embodiment of the invention is described with reference to FIGS. 1–13.

The battery charging system according to the first embodiment of the invention is comprised of a vehicle generator control unit 1, a vehicle generator 2, a battery 3, an engine control unit (hereinafter referred to as ECU) 80.

The vehicle generator 2 is comprised of a stator which includes a three-phase stator winding 21, a rotor which includes a field coil 22 and a three-phase full-wave rectifier unit 23. The output voltage of the vehicle generator 2 is regulated by controlling current to be supplied to the field coil 22. The vehicle generator 2 has output terminals (so-called B-terminal) that are respectively connected to the battery 3 and other electric loads 4.

The ECU 80 controls an engine (not shown) and sends a command pulse signal to the vehicle generator 2 for generating the output power according to battery charge condition, vehicle speed, throttle valve position and others. For this purpose, the ECU 80 includes a CPU 81 that executes a preset control program and I/O circuit 82 for inputting various signals. The ECU 80 provides the vehicle generator 2 with the command pulse signal whose duty ratio can be changed. This command pulse signal is provided by a switching circuit included in the I/O circuit 82, which is comprised of a transistor 83 and a register 84. A resistor 85 is connected in series with a signal output line of the transistor 83 to protect the same.

Figure 2:
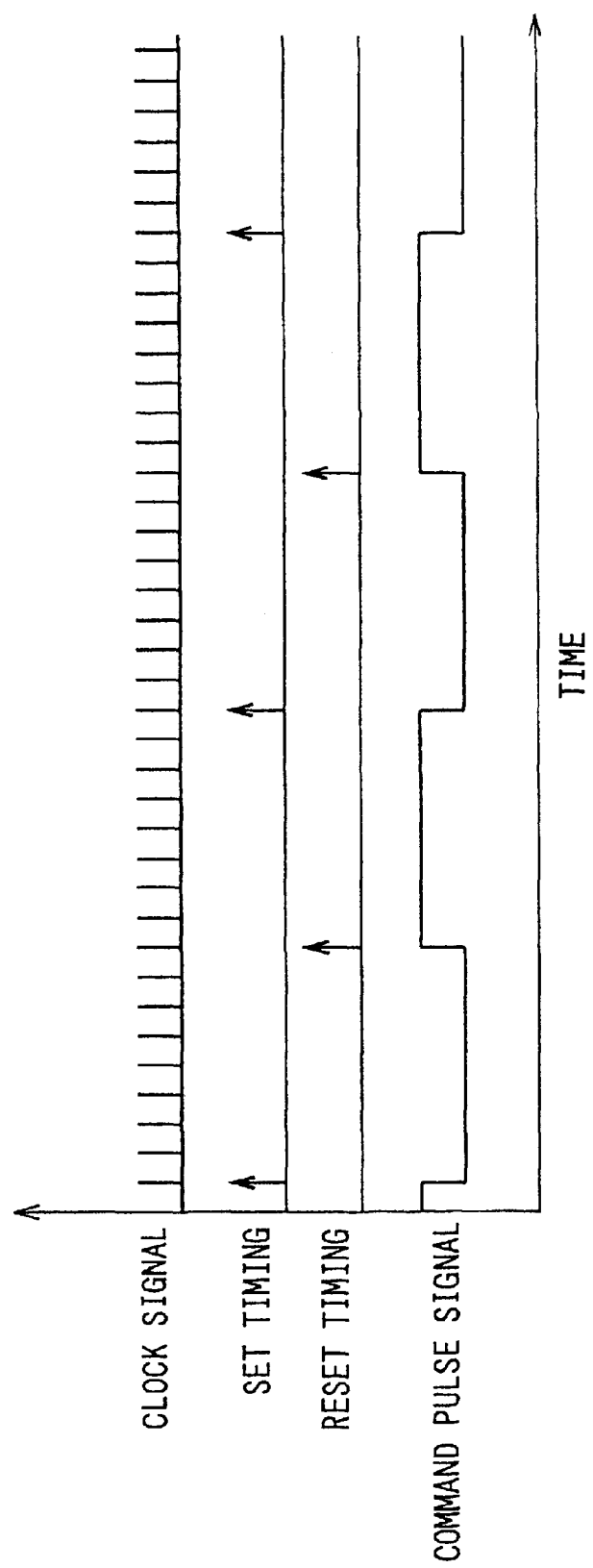
FIG. 2 is a timing chart illustrating a command pulse signal and operation timings of a register and a pulse signal generator.

As shown in FIG. 2, the CPU 81 can interrupt I/P circuit 82 at timing in synchronism with the operation clock thereof to set (store "1") or reset (store "0") the resistor 84. Therefore, the CPU 81 sets and resets the resister 84 at a predetermined cycle, thereby turning on and off the transistor 83. Accordingly, the command pulse signal having the duty ratio that corresponds to the predetermined cycle is provided.

The cycle of the command pulse signal is shorter than the time constant (about 200 ms) of the vehicle generator 2. Preferably, the cycle is of a range between two third and a quarter of the time constant of the vehicle generator 2. Since the command pulse signal is provided by the ECU 80, no additional hardware such as a communication driver is necessary. With the ECU 80, it is only necessary to rewrite the register 84 twice each pulse.

As shown in FIG. 1, the vehicle generator control unit 1 is comprised of a power transistor 11 that is connected in series with the field coil 22 of the vehicle generator 2, a fly-wheel diode 12 connected in parallel with the field coil 22 and a generator control unit 50. The generator control unit 50 controls the power transistor 11 according to the terminal voltage of the battery 3.

Figure 3:
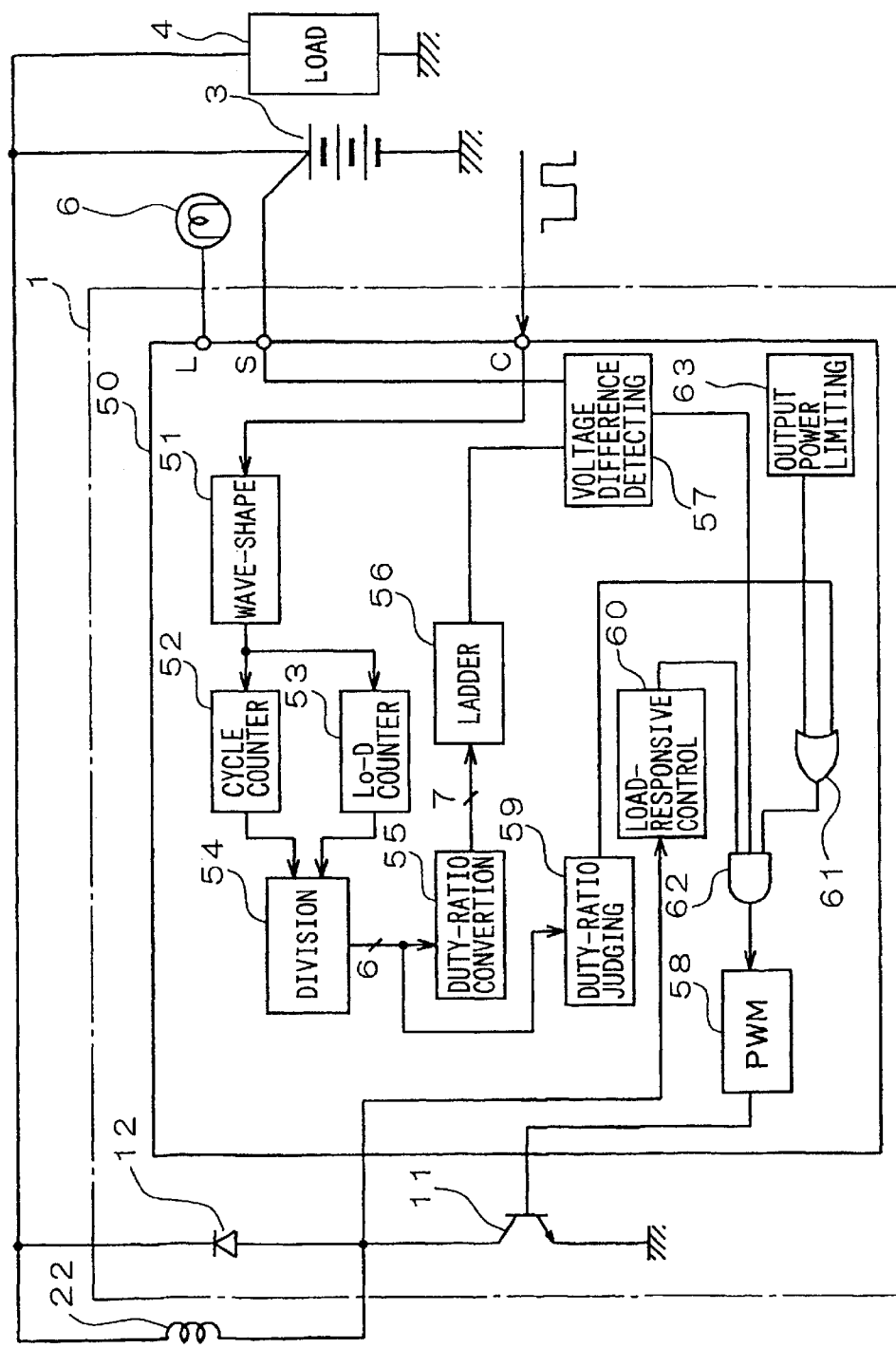
FIG. 3 is a circuit diagram of the generator control unit of the battery charging system shown in FIG. 1.

As shown in FIG. 3, the generator control unit 50 is comprised of a wave-shaping circuit 51, a cycle counter 52, a Lo-duration counter 53, a dividing circuit 54, a duty-ratio converting circuit 55, a ladder circuit 56, a voltage difference detecting circuit 57, a PWM circuit 58, a duty-ratio judging circuit 59, a load-responsive control circuit 60, an OR circuit 61, an AND circuit 62 and an output power limiting circuit 63.

The wave-shaping circuit 51 removes noises included in the pulse signal inputted to a C-terminal of the generator control unit 50 and shapes the wave form of the command pulse signal. The cycle counter 52 counts the cycle of the pulse signal after being shaped. The Lo-duration counter 53 counts the low-level duration of the pulse signal after being shaped. The dividing circuit 54 divides the number of counts of the Lo-level duration of the pulse signal by the number of counts of the cycle of the pulse signal to provide the duty ratio of the pulse signal.

Figure 4:
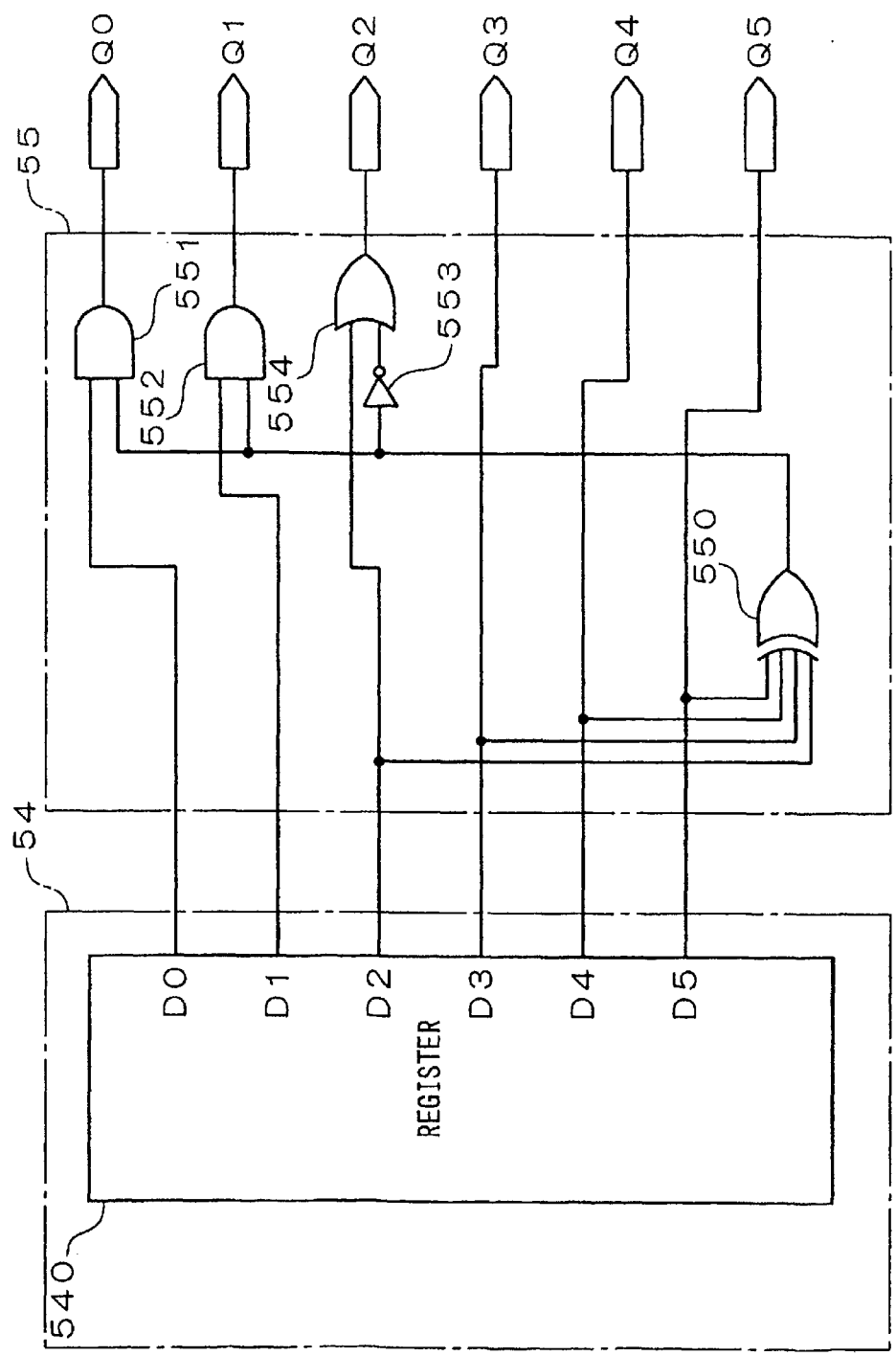
FIG. 4 is a circuit diagram of a division circuit and a duty ratio conversion circuit shown in FIG. 3.

As shown in FIG. 4, the dividing circuit 54 includes a register 540 that stores the result of dividing or the duty-ratio of the pulse signal. The register 540 stores the duty-ratio ranging from 0% to 100% in six-bit data. The number of bits is increased if more accurate data of the output voltage of the vehicle generator 2 is desired. The data stored in the register 540 is inputted into the duty-ratio converting circuit 55.

The duty-ratio converting circuit 55 is comprised of an exclusive OR circuit (hereinafter referred to as the EX-OR circuit) 550, a pair of AND circuits 551 and 52, an inverter (hereinafter referred to as the INV circuit) 553 and an OR circuit 554. The duty-ratio converting circuit 55 receives the six-bit data sent from the dividing circuit 54 and converts the data into different six-bit data to be inputted to the ladder circuit 56.

Figure 5:
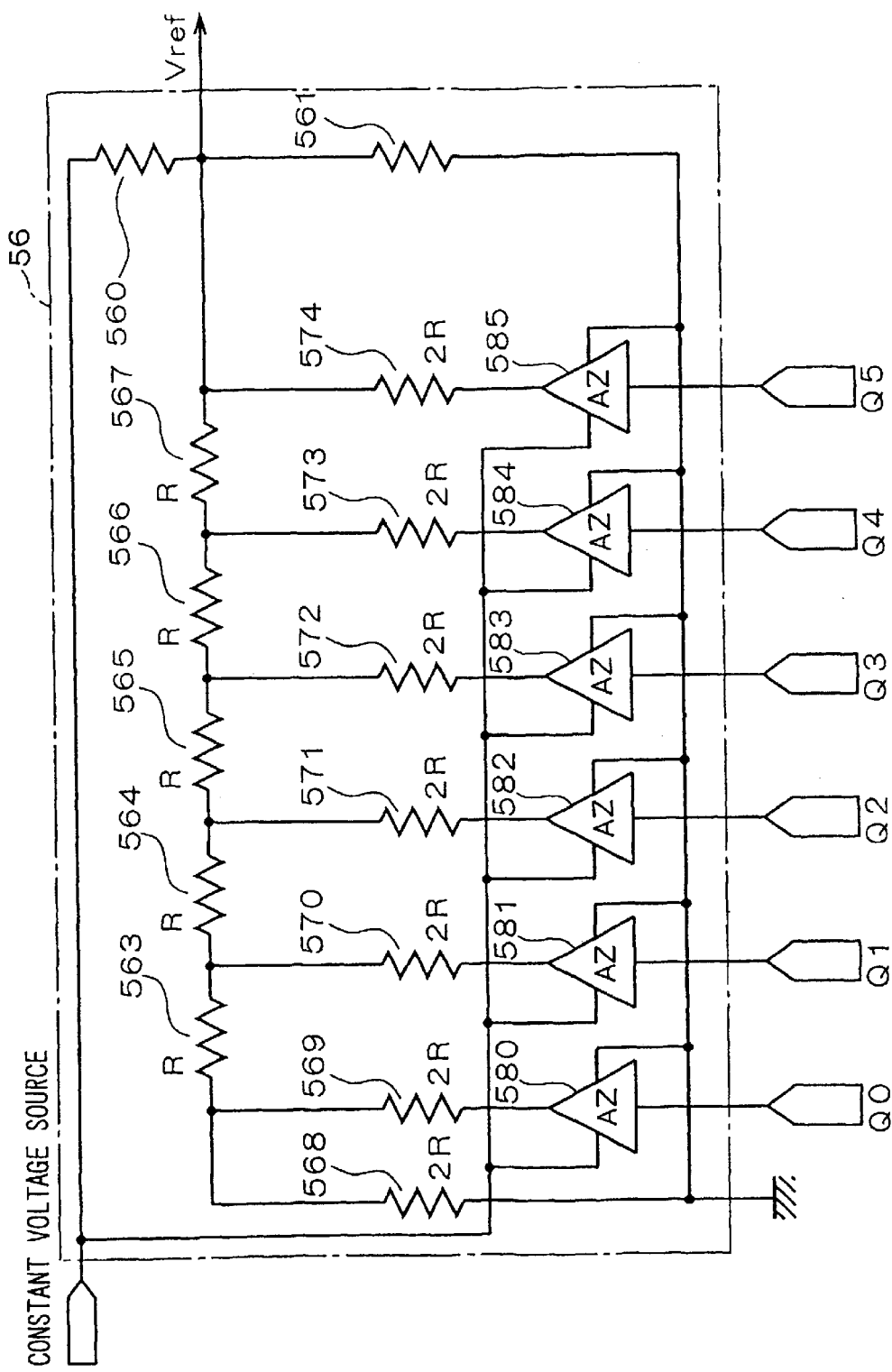
FIG. 5 is a circuit diagram of a ladder circuit shown in FIG. 3.

The ladder circuit 56 provides a reference voltage Vref that corresponds to the six-bit data outputted by the duty-ratio converting circuit 55. The ladder circuit 56 is comprised of resistors 560, 561, 563–574 and buffer circuits 580–585, as shown in FIG. 5.

The resistors 563–574 are connected to form a ladder-shape circuit section, which is connected to a dividing point of a voltage dividing circuit that is comprised of the resistors 560 and 561. The total resistance of the ladder-shape circuit section formed of the resistors 563–574 is changed by changing the signal levels of the input signals of the buffer circuits 580–585.

Figure 6:
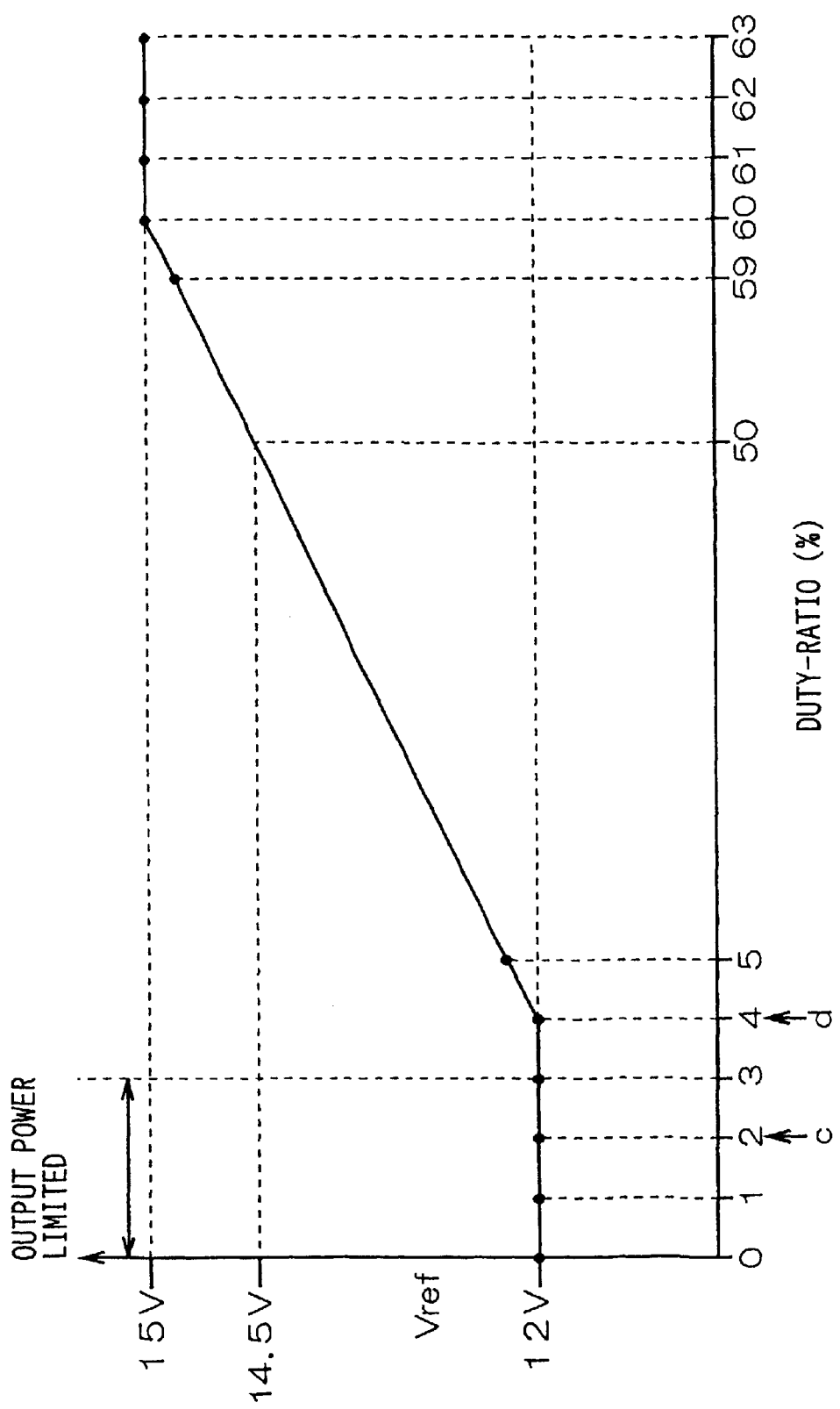
FIG. 6 is a graph showing a relationship between reference voltages and duty ratios of the command pulse signal.

The voltage divided by the dividing circuit is outputted as the reference voltage Vref, which is shown in FIG. 6.

Since the duty-ratio of the command pulse signal is six-bit data, the duty-ratio ranging from 0% to 100% corresponds to the data ranging from "0" to "63".

If the data ranges from "0" to "3", the levels of the second bit terminal D2 to the fifth bit terminal D5 of the register 540 are all "0", so that the output level of the EX-OR circuit 550 is "0". Accordingly, the level of the output terminals of the AND circuits 551 and 552 are "0", and the level of the OR circuit 554 is "1".

If the data is "4", the zero-bit terminal D0 and the first bit terminal D1 of the register 540 provides "0", and the second bit terminal D2 of the register 540 provides "1". Accordingly, the AND circuits 551 and 552 output "0", and the OR circuit 554 outputs "1".

Thus, as for the data "0"–"4", the duty-ratio converting circuit 55 provides the same output signals (the second bit terminal Q2 provides "1" and the other terminals provide "0") so that the ladder circuit 56 the reference voltage Vref at 12 V.

As for the data "60"–"63", the second through fifth bit terminals D2–D5 all provide "1", so that the EX-OR circuit 550 outputs "0". Therefore, the AND circuits 551 and 552 output "0", and the OR circuit 554 outputs "1". That is, the duty-ratio converting circuit 55 provides the same output signals (the zero bit terminal Q0 and the first bit terminal provide "0" and the other terminals provide "1"), so that the ladder circuit 56 sets the reference voltage Vref at 15 V.

As for the data other than the data "0"–"4" and "60"–"63", the output levels of the register 540 are directly outputted from the duty-ratio converting circuit 55, so that the reference voltage Vref becomes proportional to the duty-ratio of the pulse signal.

The voltage difference detecting circuit 57 compares any of the above-described reference voltages with the battery voltage that is applied to the S-terminal of the generator control unit 50 and provides a high level or low level signal according to the comparison result. When the AND circuit 62 outputs a high level signal, the PWM circuit 58 provides a drive signal that has a certain duty-ratio to drive the power transistor 11. When the PWM circuit 58 provides the drive signal, the power transistor 11 is turned on and off to supply current to the field coil 22. Accordingly, the output voltage of the vehicle generator 2, and the terminal voltage of the battery rises up.

The duty-ratio judging circuit 59 judges whether a duty ratio is included in a specific range or not. If the duty ratio is in the specific range, the output signal of the duty-ratio judging circuit 59 changes from the low level to the high level.

Figure 7:
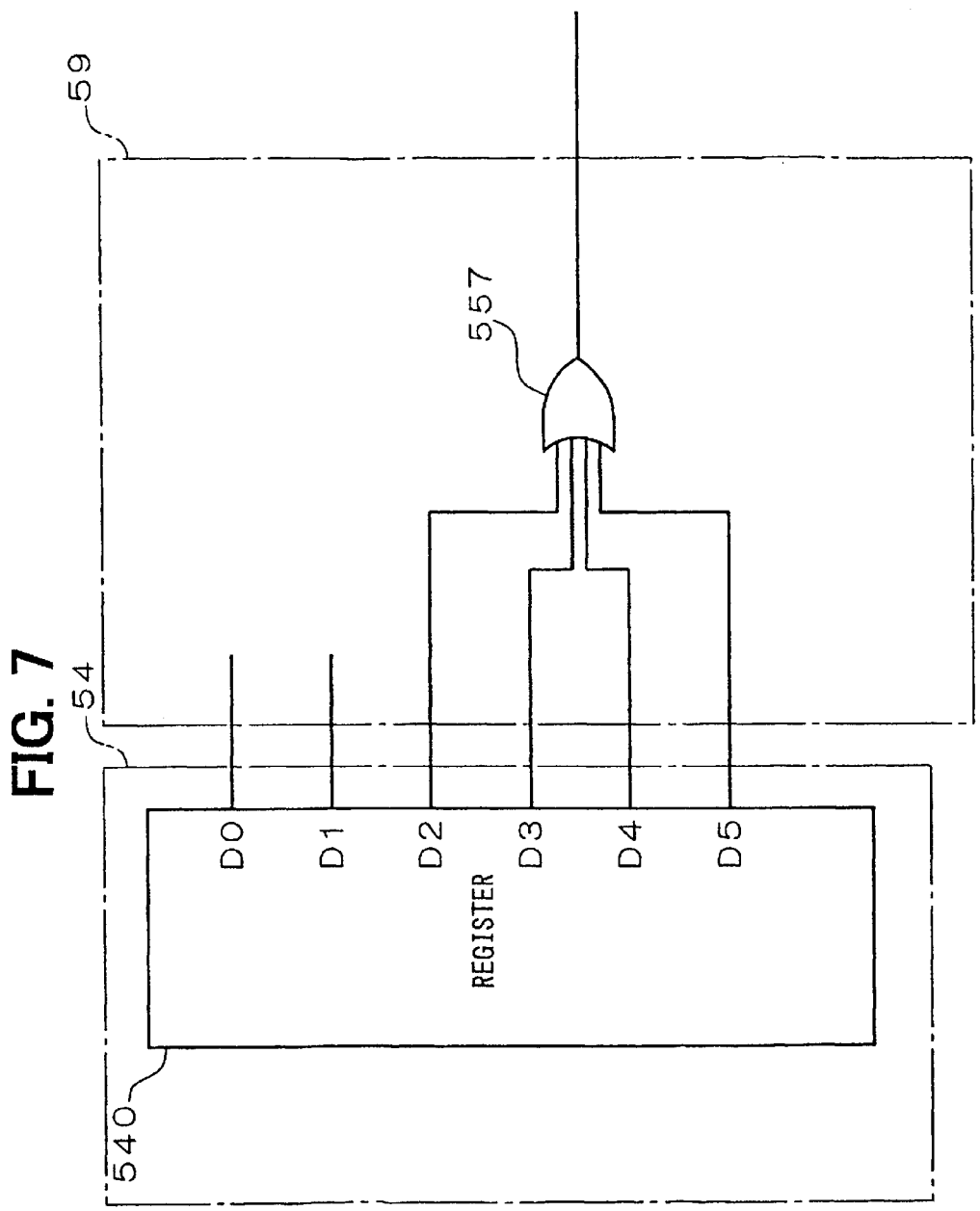
FIG. 7 is a circuit diagram of a duty ratio judging circuit shown in FIG. 3.

As shown in FIG. 7, the duty-ratio judging circuit 59 includes an OR circuit 557. The OR circuit 557 outputs the logical sum of the signals of the second bit terminal D2 through the fifth bit terminal D5 of the register 540. In other words, the duty-ratio judging circuit 59 outputs a high level signal when the six-bit data is equal to or more than "4" and a low level signal when the six-bit data is equal to or less than "3".

The load-responsive control circuit 60 is connected to a junction of the field coil 22 and the power transistor 11. The load-responsive control circuit 60 detects a conduction ratio of the transistor 11 and gradually increases the conduction ratio. The output power limiting circuit 63 limits the output power of the vehicle generator by lowering the conduction ratio. The OR circuit 61 has two input terminals that are respectively connected to the duty-ratio judging circuit 59 and the output power limiting circuit 63. When the six-bit data corresponding to the duty-ratio is equal to or less than "3", or when the duty-ratio judging circuit 59 outputs a low level signal, the output signal of the output power limiting circuit 63 is applied to the AND circuit 62 via the OR circuit 61 to limit the output power. When the six-bit data corresponding to the duty-ratio is equal to or more than "4", or when the duty-ratio judging circuit 59 outputs a high level signal, the level of the output signal of the OR circuit 61 is held to be high irrespective of the output signal of the output power limiting circuit 63. In other words, the output terminal of the output power limiting circuit 63 is masked to, thereby, stop limiting the output power.

The AND circuit 62 outputs a signal corresponding to the logical product of the output signals of the voltage difference detecting circuit 57, the load-responsive control circuit 60 and the OR circuit 61 and inputs the signal to the PWM circuit 58.

Figure 8:
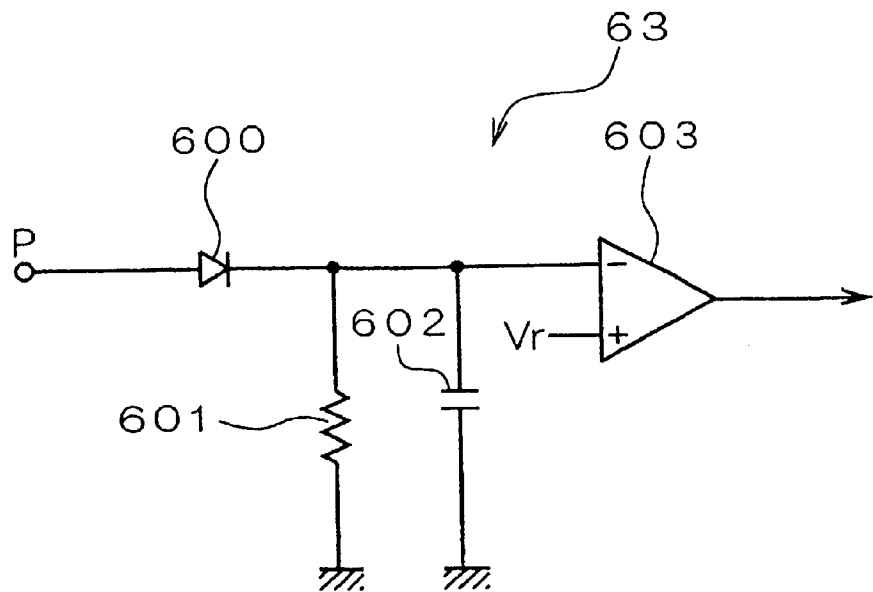
FIG. 8 is a circuit diagram of an output power limiting circuit shown in FIG. 3.

As shown in FIG. 8, the output power limiting circuit 63 controls the peak voltage appearing in one of the phase windings of the stator winding 23. The output power limiting circuit 63 includes a diode 600, a resistor 601, a capacitor 602 and a voltage comparator 603. The peak voltage of the phase voltage that is applied to the terminal P is held by a circuit that is comprised of the diode 600, the resistor 601 and the capacitor 602. If the peak voltage is higher than a reference voltage Vr, the voltage comparator 603 or the output power limiting circuit 63 outputs a low level signal. This low level signal is inputted to the OR circuit 61, so that the generator's output power can be limited.

Preferably, the terminal voltage of the battery 3 when it is opened (hereinafter referred to as the open terminal voltage), or the terminal voltage of the battery when it supplies a starter while cranking (hereinafter referred to as the cranking voltage) is used as the reference voltage Vr. If the reference voltage Vr is the open terminal voltage, the internal voltage of the vehicle generator 2 can be made lower than the open terminal voltage so that the vehicle generator 2 can be prevented from supplying a large amount of charging current to the battery 3. On the other hand, if the reference voltage Vr is the cranking voltage, the internal voltage of the vehicle generator 2 can be made lower than the cranking voltage so that the output power of the vehicle generator 2 can be effectively limited.

Figure 9:
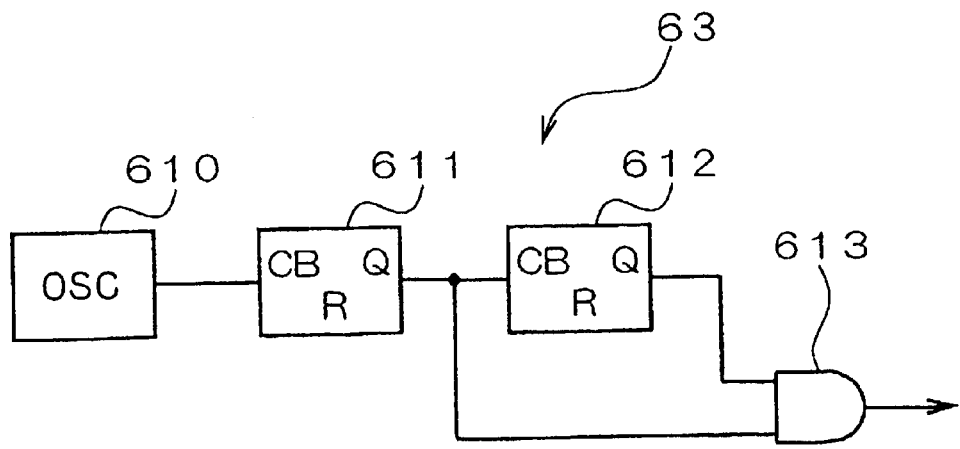
FIG. 9 is a circuit diagram of a variation of the output power limiting circuit.

The output power limiting circuit 63 can be modified, as shown in FIG. 9. The output power limiting circuit 63 is a circuit for providing a pulse signal to control the conduction ratio of the power transistor 11 that is comprised of an oscillation circuit 610, frequency dividing circuits 611 and 612 and an AND circuit 613.

Figure 10:
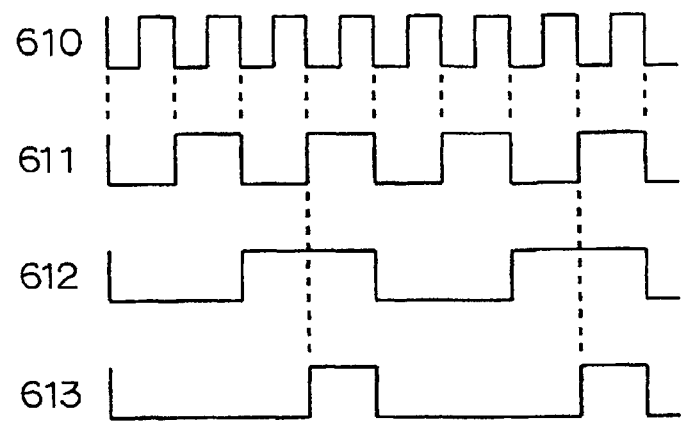
FIG. 10 is a timing chart of operation of various portions of the output power limiting circuit shown in FIG. 9.

As shown in FIG. 10, the AND circuit 613 outputs the logical product of the output signals of the frequency dividing circuits 611 and 612 based on the clock signal provided by the oscillation circuit 610, so that a pulse signal of the duty-ratio of 25% can be provided. The duty-ratio can be changed if the number and the connection of the voltage dividing circuits are changed.

Figure 11:
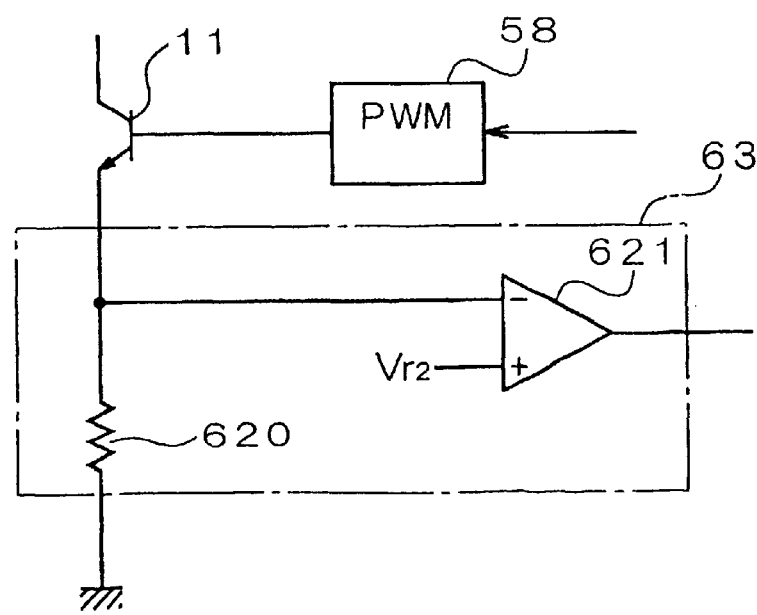
FIG. 11 is a circuit diagram of another variation of the output power limiting circuit.

Another variation of the output power limiting circuit 63 is shown in FIG. 11. The output power limiting circuit 63 is a circuit for directly limiting the field current, which is comprised of a current detecting resistor 620 connected to the emitter of the power transistor 11 and a voltage comparator 621 for comparing the voltage drop of the resistor 620 with a reference voltage Vr2. If a large amount of the field current is supplied to the field coil 22, the voltage drop becomes larger than the reference voltage Vr2. Accordingly, the voltage comparator 621 outputs a low level signal, which is the output signal of the output power limiting circuit 63. This low level signal is inputted to the OR circuit 61 so that the output power if the vehicle generator can be limited.

Figure 12:
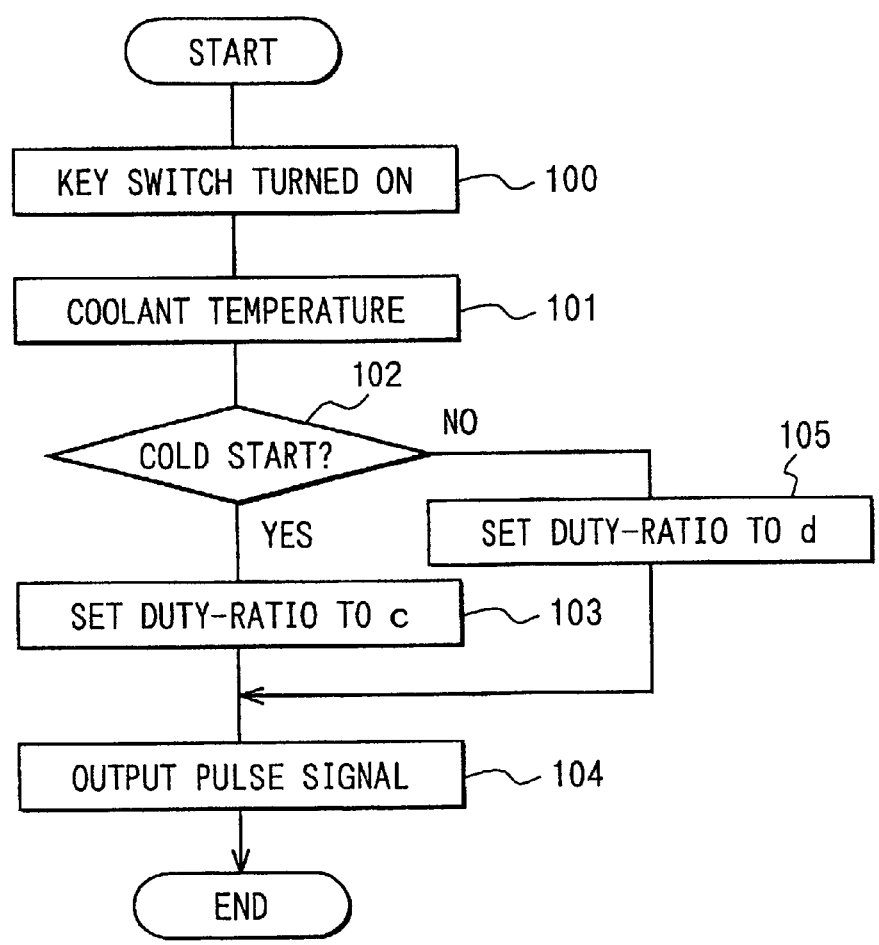
FIG. 12 is a flow diagram of the battery charging system according to the first embodiment.

Operation of the battery charging system according to the first embodiment of the invention is described with reference to a flow diagram shown in FIG. 12.

After the CPU 81 detects turning-on of a key switch at step 100, coolant temperature is detected at step 102. The temperature of an engine oil or ambient temperature is also available instead of the coolant temperature.

Then, the CPU 81 examines whether the coolant temperature is as low as temperature requiring cold start of the engine at step 102. If the result of the step 102 is YES, that is, the temperature is as low as the temperature requiring cold start, the CPU 81 sets the duty-ration at c (e.g. 3.13%) at step 103. Then, the CPU 81 rewrite the content of the register 84 repeatedly at predetermined timing to thereby send the command pulse signal to the vehicle generator control unit 1 at step 104. The vehicle generator control unit 1 converts the duty-ratio (3.13%) into six-bit data "2" and set the reference voltage Vref at 12 V to control the vehicle generator 2, as shown in FIG. 6. Thus, the output power of the vehicle generator 2 is limited and the torque of vehicle generator 2 is lowered, so that complete engine starting can be ensured.

After the CPU 81 detects engine starting, it provides a command pulse signal that does not limit the output power of the generator. Therefore, the output power increases as the rotation speed of the engine increases. However, abrupt increase of the torque can be prevented by load responsive control of the system according to the first embodiment of the invention.

If the coolant temperature is not so low as the temperature requiring cold start, No is raised at step 102. Then, the CPU 81 set the duty-ratio at d (6.25%) at step 105. Accordingly, the content of the register 82 of the I/O circuit 82 are repeatedly rewritten at predetermined timing to provide a pulse signal, which is sent to the vehicle generator control unit 1 at step 104. The vehicle generator control unit 1 converts the duty-ratio (6.25%) into six-bit data "4" and set the reference voltage Vref at 12 V to control the vehicle generator 2, as shown in FIG. 6. Thus, the output power of the vehicle generator 2 is not limited and the torque of vehicle generator 2 is prevented from excessively reducing. Therefore, engine vibration can be prevented.

It is possible to take the rotation speed of the vehicle generator into account for judging whether the output power of the vehicle generator is to be limited or not.

Figure 13:
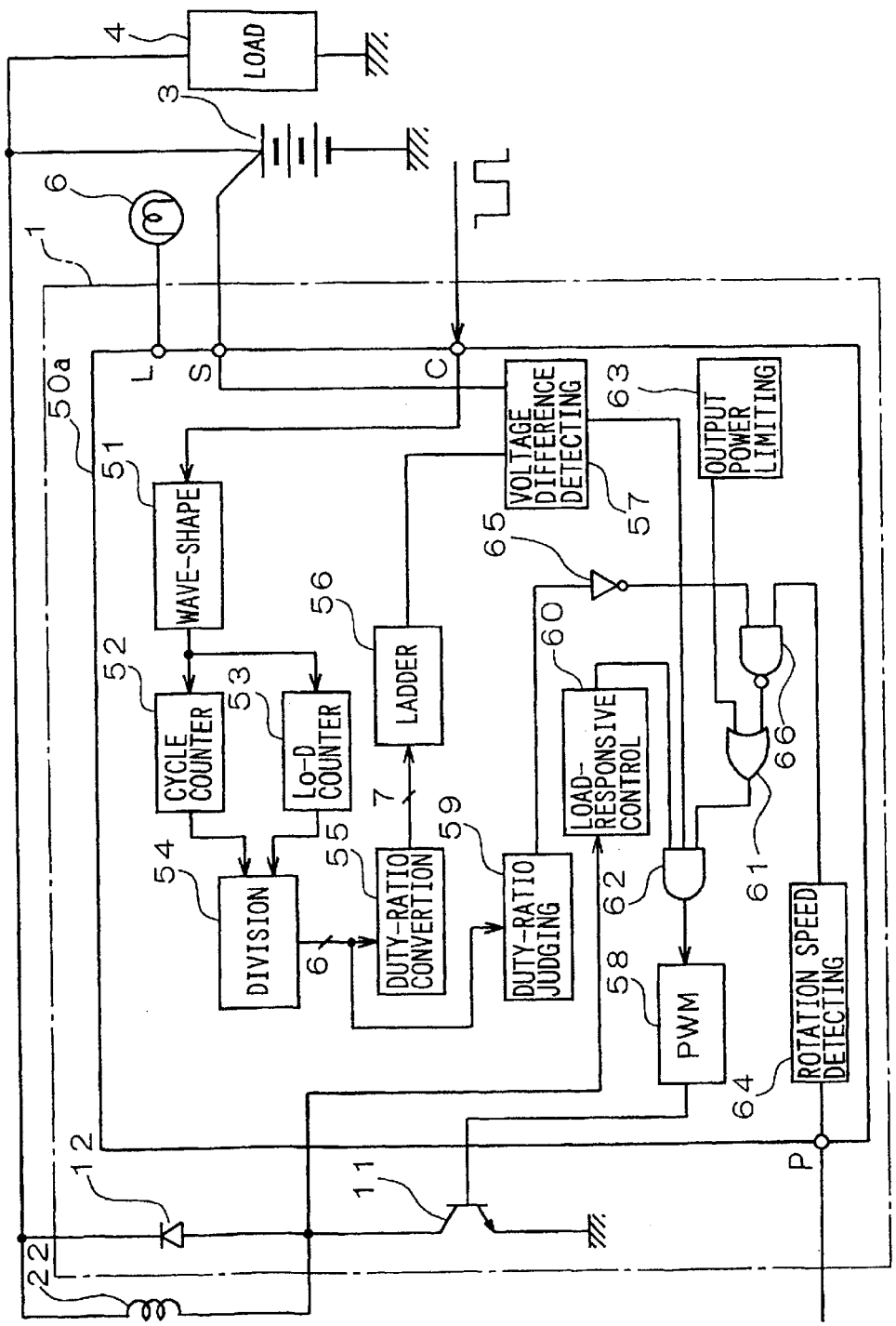
FIG. 13 is a circuit diagram of a variation of the generator control unit shown in FIG. 3.

A generator control unit 50a that is a variation of the generator control unit 50 is shown in FIG. 13. The generator control unit 50a includes a rotation speed detecting circuit 64, an inverter (INV circuit) 65 and a NAND circuit 66 in addition to all the elements and components of the generator control unit 50.

The rotation speed detecting circuit 64 measures the cycle of the phase voltage that is applied to the P terminal, thereby detecting the rotation speed of the vehicle generator 2. If the rotation speed is lower than a predetermined speed, the rotation speed detecting circuit 64 provides a high level signal. For example, if the rotation speed is lower than a minimum speed that corresponds to an idling speed of an engine, the rotation speed detecting circuit 64 provides the high level signal, which is inputted to one of two input terminals of the NAND circuit 66. Therefore, if a high level signal is inputted to the other input terminal of the NAND circuit 66 (when the duty-ratio judging circuit 59 provides a low level signal), the NAND circuit 66 provides a low level signal to make the function of the output power limiting circuit 63 effective.

Thus, the output power of the vehicle generator 2 is only limited when the rotation speed thereof is lower than a predetermined rotation speed. Therefore, the number of the duty-ratios to be allotted for setting the reference voltage can be increased. Accordingly, more accurate control of the output power can be achieved. For example, it is possible to stop limiting the output power of the generator if the reference voltage Vref is set at 12 V while the vehicle is being accelerated.

A battery charging system according to the second embodiment of the invention is described with reference to FIGS. 14–18. Incidentally, the same reference numeral represents the same or substantially the same part, portion or component as that of the first embodiment hereafter. Accordingly, detailed description of such parts, portions or components is not repeated.

Figure 14:
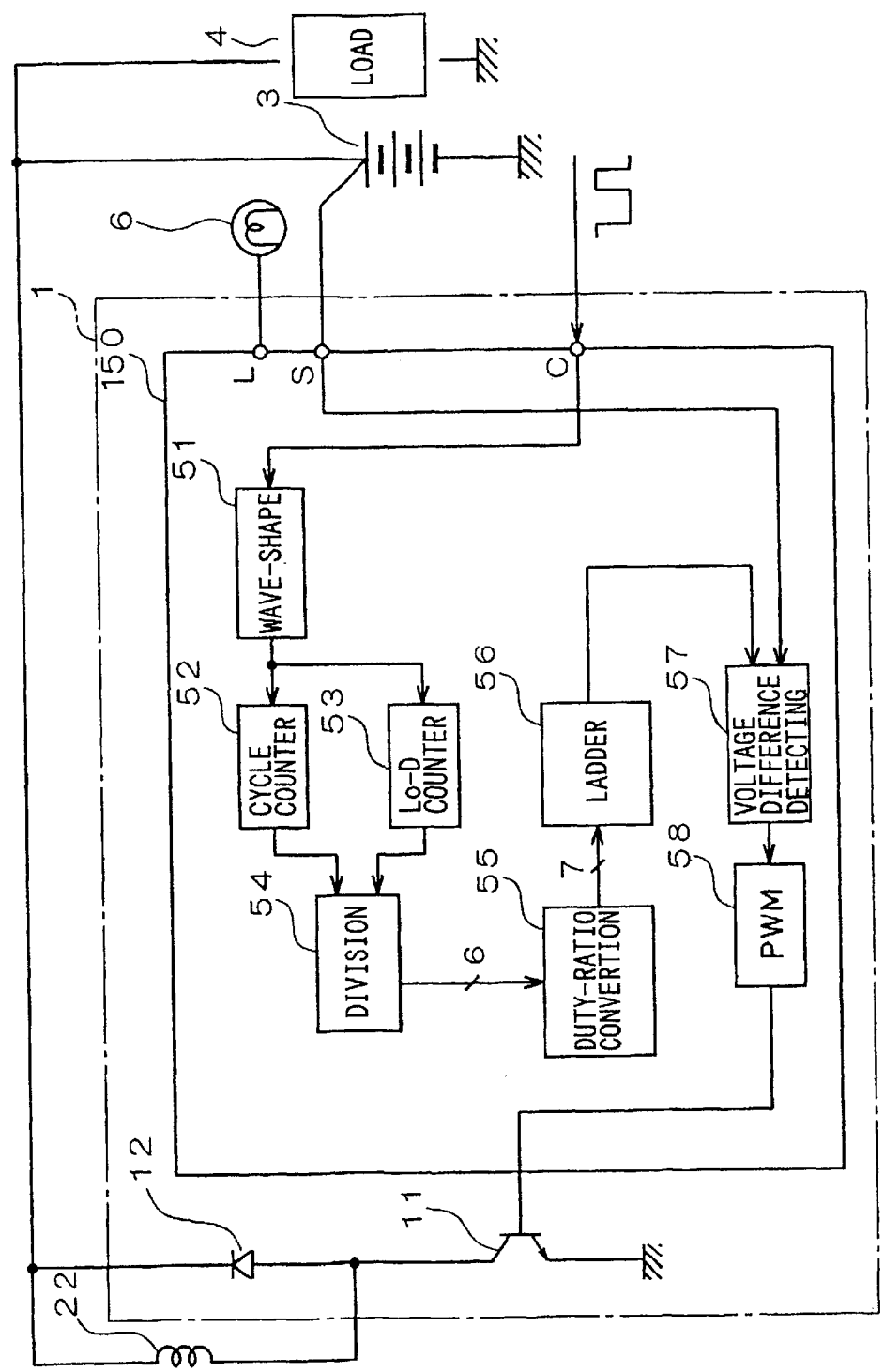
FIG. 14 is a circuit diagram of a generator control unit of a battery charging system according to the second embodiment of the invention.

As shown in FIG. 14, a generator control unit 150 is comprised of the wave-shaping circuit 51, the cycle counter 52, the Lo-duration counter 53, the dividing circuit 54, the duty-ratio converting circuit 55a, the ladder circuit 56, the voltage difference detecting circuit 57 and the PWM circuit 58. That is, the duty-ratio judging circuit 59, the load-responsive control circuit 60, the OR circuit 61, the AND circuit 62 and the output power limiting circuit 63 are removed from the generator control unit 50 of the battery charging system according to the first embodiment.

Figure 15:
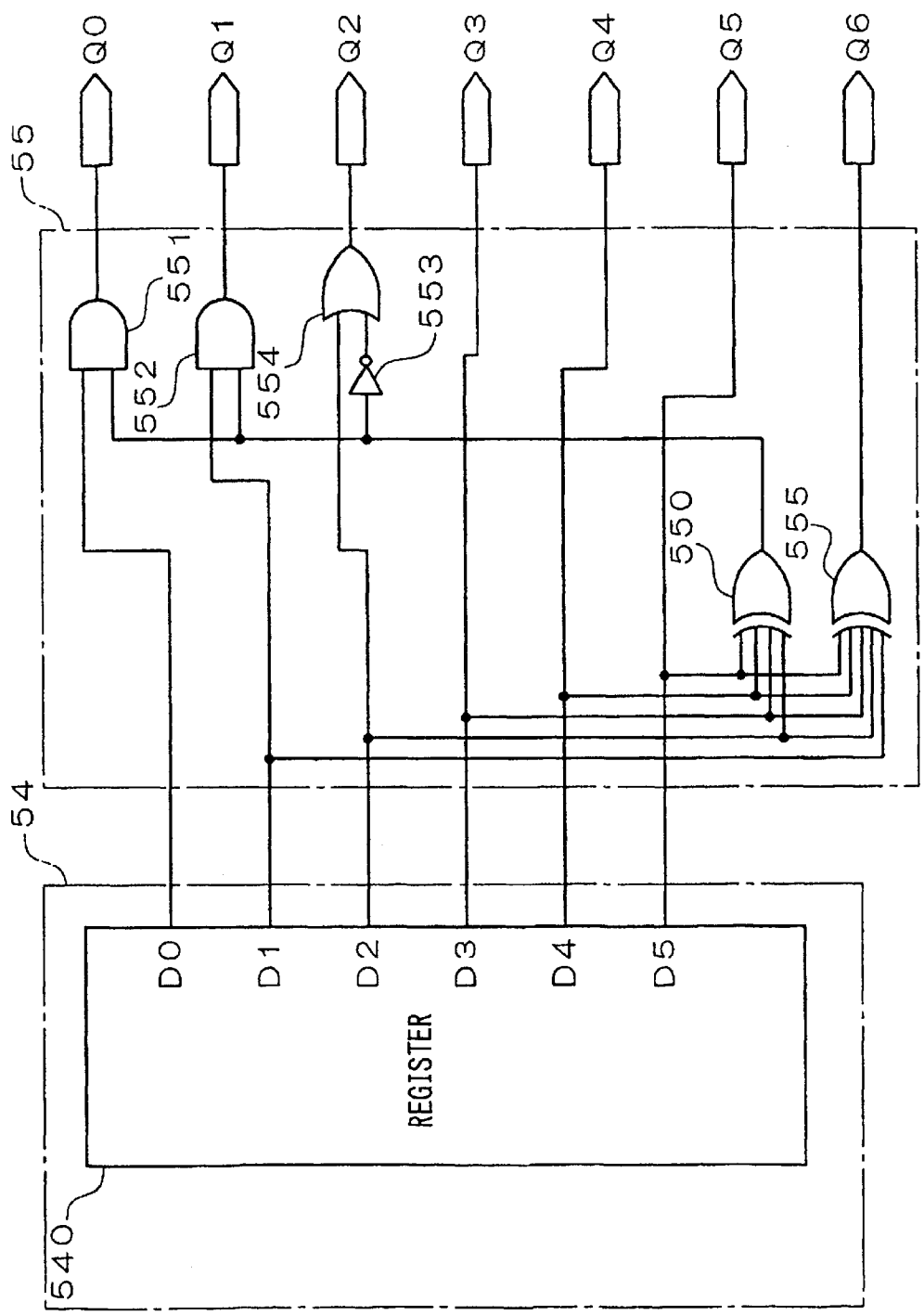
FIG. 15 is a circuit diagram of a division circuit and a duty ratio conversion circuit shown in FIG. 14.

As shown in FIG. 15, the duty-ratio converting circuit 55a is comprised of a pair of EX-OR circuits 550 and 555, a pair of AND circuits 551 and 52, an INV circuit 553 and an OR circuit 554. The duty-ratio converting circuit 55 receives the six-bit data sent from the dividing circuit 54 and converts the data into different seven-bit data to be inputted to the ladder circuit 56. It is easy to provide the reference voltage according to the temperature of the battery, as described below.

Figure 16:
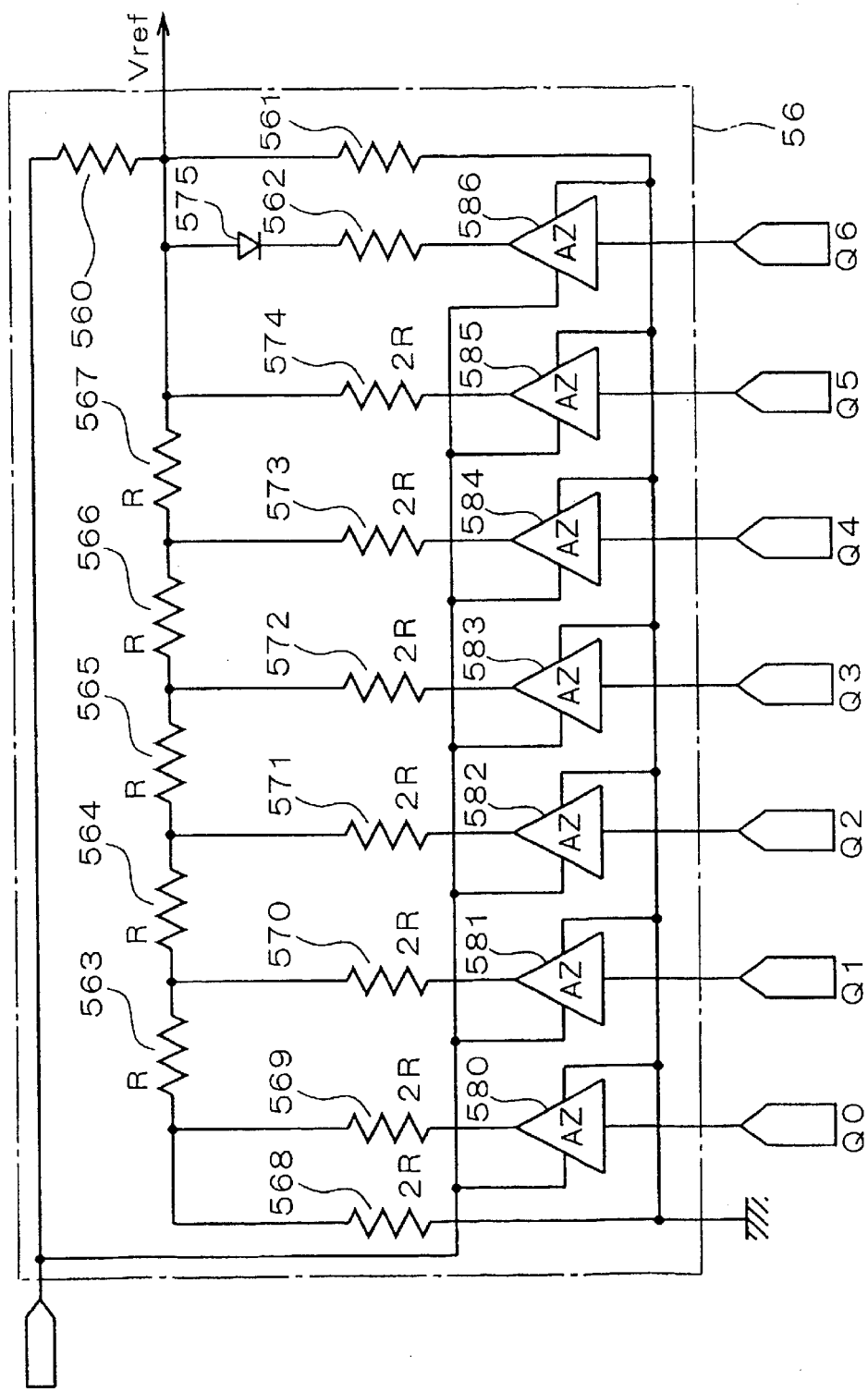
FIG. 16 is a circuit diagram of a ladder circuit shown in FIG. 14.

As shown in FIG. 16, the ladder circuit 56 is comprised of resistors 560–574, a diode 575, and buffer circuits 580–586. The resistors 563–574 are connected together to form a ladder-shape circuit section, which is connected to a dividing point of a voltage dividing circuit that is comprised of the resistors 560 and 561. The total resistance of the ladder-shape circuit section formed of the resistors 563–574 is changed by changing the signal levels of the input signals of the buffer circuits 580–585. The voltage divided by the dividing circuit is outputted as the reference voltage Vref.

The diode 575 and the resistor 575 of the ladder circuit 56 form a series circuit, an end of which is connected to the junction of the voltage dividing circuit. The other end of the series circuit is connected to the buffer circuit 586. When the output of the buffer circuit 586 is high or "1", the diode 575 is inversely biased. Accordingly, no current flows through the diode 575, and the reference voltage Vref does not change. On the other hand, when the output of the buffer circuit 586 is low or "0", current flows through the diode 575, the reference voltage Vref changes. The reference voltage Vref changes as the temperature of the diode 575 changes, because the amount of the current changes with the temperatures of the diode 575. The vehicle generator control system 1 is usually mounted in a vehicle engine compartment, and, therefore the temperature of the diode 575 is closely related to the temperature of the battery that is also mounted in the engine compartment.

Figure 17:
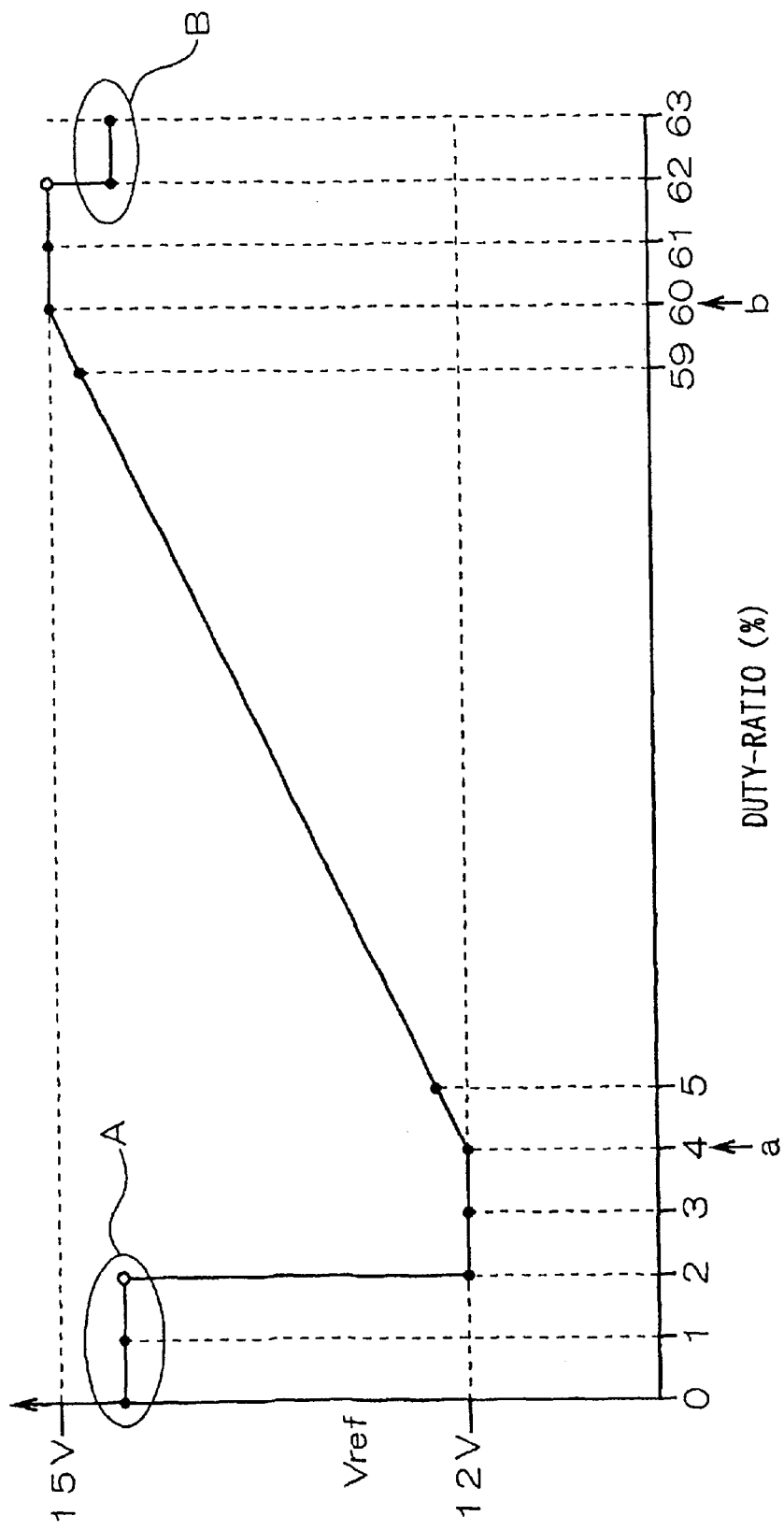
FIG. 17 is a graph showing a relationship between reference voltages and duty ratios of a pulse signal.

The voltage divided by the voltage dividing circuit is outputted as the reference voltage Vref, which is shown in FIG. 17.

Since the duty-ratio of the command pulse signal is six-bit data, the duty ratio ranging from 0% to 100% corresponds to the data ranging from "0" to "63".

If the data is "0" and "1", only the zero-th bit terminal D0 provides "0" or "1", the first bit terminal D1 to the fifth bit terminal D5 of the register 540 provide all "0", so that the output level of the EX-OR circuit 555 is "1". Accordingly, the level of the output terminals Q0–Q6 of the duty-ratio converting circuit 55 are all "0" Thus, the ladder circuit 56 provides a temperature responsive reference voltage Vref, as indicated by circle A in FIG. 17.

If the data is "2" or "3", the level of the first bit terminal D1 is "1", and the levels of the second bit terminal D2 to the fifth bit terminal D5 are all "0", so that the output level of the EX-OR circuit 555, or the output level of the sixth bit terminal Q6 of the duty-ratio converting circuit 55 is "1". Accordingly, the level of the input terminal of the buffer circuit 586 becomes "1". As a result, the ladder circuit 56 provides the reference voltage Vref that does not change with the temperature.

If the data is "4", the second bit terminal D2 becomes "1", and output of the EX-OR circuit 550 becomes "1", so that the output of the EX-OR circuit 555 or the sixth bit terminal Q6 of the duty-ratio converting circuit 55 becomes "1". Accordingly, the input terminal of the buffer circuit 586 of the ladder circuit 56 becomes "1". As a result, the ladder circuit 56 provides the reference voltage Vref that does not change with the temperature.

Thus, as for the data "2"–"4", the duty-ratio converting circuit 55 provides all "0" at the zero-th bit terminal–fifth bit terminal so that the ladder circuit 56 sets the reference voltage Vref at 12 V.

As for the data "60" and "61", the first bit terminal provides "0", and the second through fifth bit terminals D2–D5 all provide "1", so that the terminal Q6 of the duty-ratio converting circuit 55 outputs "1". Therefore, "1" is applied to the input terminal of the buffer circuit 586 of the ladder circuit 56, so that the ladder circuit 56 provides the reference voltage Vref that does not change with the temperature. Thus, the zero-th bit terminal Q0 and the first bit terminal Q1 of the duty-ratio converting circuit 55 provide "0", and the second through fifth bit terminals Q2–Q5 provide "1", so that the ladder circuit 56 provides the reference voltage Vref for 15 V.

As for the data "62" and "63", since all the first through fifth bit terminals D1–D5 of the register 540 provide "1", the output of the EX-OR circuit 555, or the sixth terminal Q6 of the duty-ratio converting circuit 55 provides "0". Accordingly, the input of the buffer circuit 586 of the ladder circuit 56 becomes "0", so that the ladder circuit 56 provides the reference voltage Vref that changes with the temperature, as shown in FIG. 17.

Figure 18:
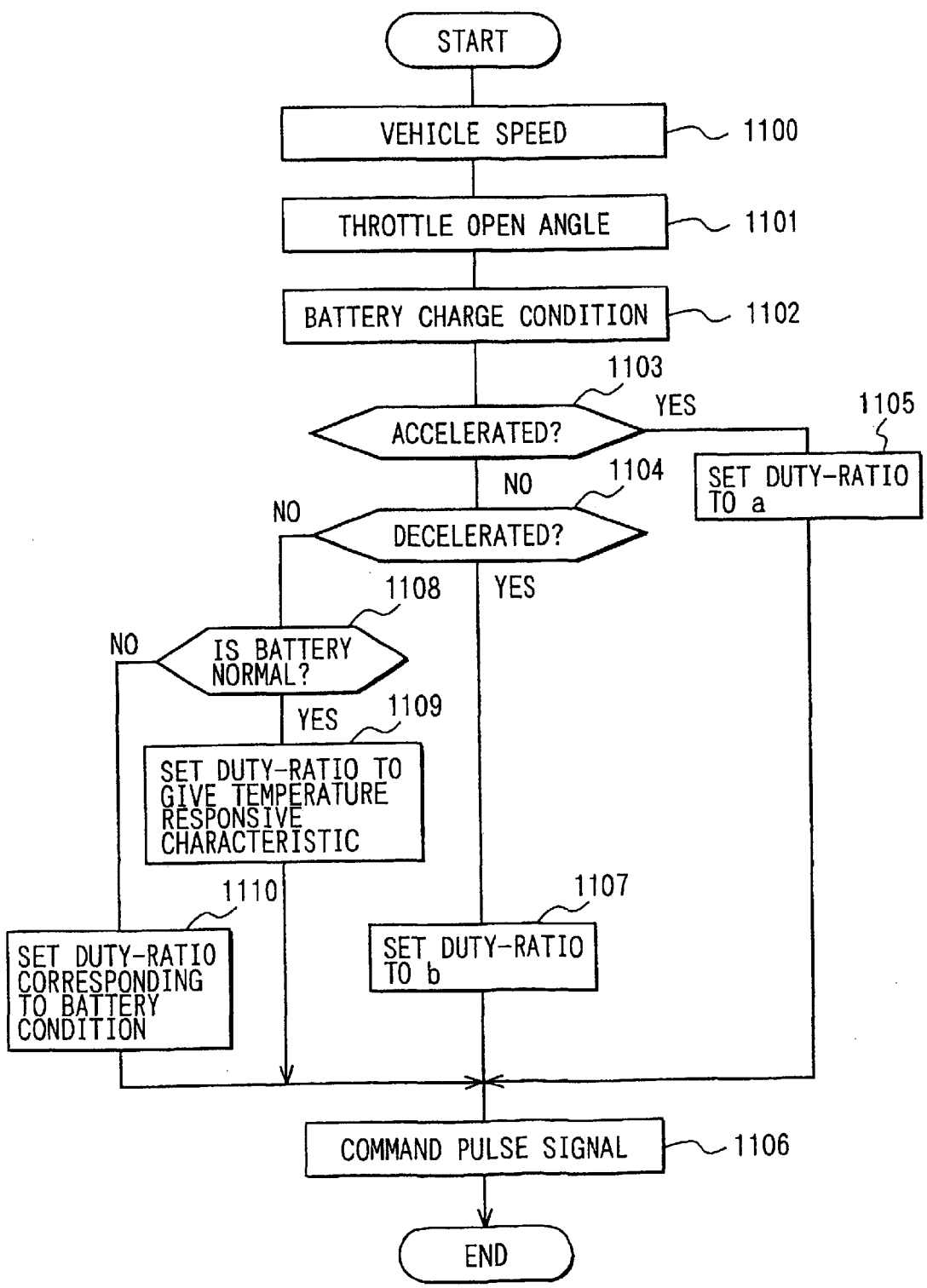
FIG. 18 is a flow diagram of the battery charging system according to the second embodiment.

The operation of the battery charging system according to the second embodiment is described with reference to a flow diagram shown in FIG. 18.

The CPU 81 detects vehicle speed at step 1100, a throttle open angle at step 1101 and the charge condition of the battery 3 at step 1102. The battery charge condition can be estimated by integrating the current charged into or discharged from the battery 3.

The CPU 81 examines whether the vehicle is accelerated or not at step 1103, whether the vehicle is decelerated at step 1104 according to the throttle open angle.

If the vehicle is accelerated, YES is put up at step 1103. Thereafter, the CPU 81 sets the duty-ratio of the command pulse signal at a (e.g. 6.25%) at step 1105, and repeatedly rewrite the content of the register 84 of the I/O circuit 82 so that the duty-ratio becomes a. Then, the command pulse signal is sent to the vehicle generator control unit 1 at step 1106. The vehicle generator control unit 1 converts the duty-ratio (6.25%) into six-bit data "4" and sets the reference voltage at 12 V, thereby regulating the output voltage of the vehicle generator 2. Thus, the output power of the vehicle generator 2 is stopped or limited, so that the engine load can be reduced.

If the vehicle is decelerated, NO is put up at step 1103, and YES is put up at step 1104. Then, the CPU 81 sets the duty-ratio at b (e.g. 93.75%) at step 1107 and repeatedly rewrite the content of the register 84 of the I/O circuit 82 so that the duty-ratio becomes b. Then, the command pulse signal is sent to the vehicle generator control unit 1 at step 1106. The generator control unit 1 converts the duty-ratio (93.75%) of the command pulse signal into six-bit data "60" and sets the reference voltage Vref at 15 V, thereby regulating the output voltage of the vehicle generator 2. Thus, the output power of the vehicle generator 2 is increased so that the kinetic energy of the vehicle can be effectively converted into electric power and charged to the battery 3.

If the vehicle is neither accelerated nor decelerated, NO is put up at step 1104, and the CPU 81 examines whether the charge condition of the battery 3 is normal or not at step 1108. For example, if the battery is charged 95% of its full capacity, YES is put up. Subsequently, the CPU 81 sets the duty-ratio of the command pulse signal at a value to give the reference voltage Vref a temperature responsive characteristic (e.g. the value indicated by circle A in FIG. 17) at step 1109. Therefore, the CPU 81 repeatedly rewrites the content of the register 84 of the I/O circuit 82 at predetermined timing so that the duty-ratio becomes such a value and sends the command pulse signal to the vehicle generator control unit 1 at step 1106. The vehicle generator control unit 1 converts the command pulse signal into six-bit data and sets the reference voltage Vref that has a temperature responsive characteristic, thereby regulating the output voltage of the vehicle generator 2. Thus, the reference voltage Vref that is responsive to the temperature of the battery 3 can be provided, so that ideal battery charging can be achieved. Although the reference voltage Vref that is responsive to the temperature is set even if the duty-ratio is 0%, the command pulse signal having the duty-ratio being 0 can be provided by holding the content of the resistor to "0". Therefore, the burden of process for the CPU 81 to bear can be reduced.

If the charge condition of the battery is not normal or less than 95% of the battery capacity, NO is put up at step 1108, and the CPU 81 sets the duty-ratio of the command pulse signal at a value corresponding to the battery charge condition at step 1110. Therefore, the CPU 81 repeatedly rewrites the content of the register 84 of the I/O circuit 82 at predetermined timing so that the duty-ratio becomes such a value and sends the command pulse signal to the vehicle generator control unit 1 at step 1106.

Thus, the reference voltage Vref can be easily kept constant near the minimum or maximum value of the duty-ratio.

The reference voltage Vref is set according to the temperature of the place where the ladder circuit 56 is mounted. That is, the ECU 80 can be disposed anywhere in the space of the vehicle.

A battery charging system according to the third embodiment of the invention is described with reference to FIGS. 19–23.

Figure 19:
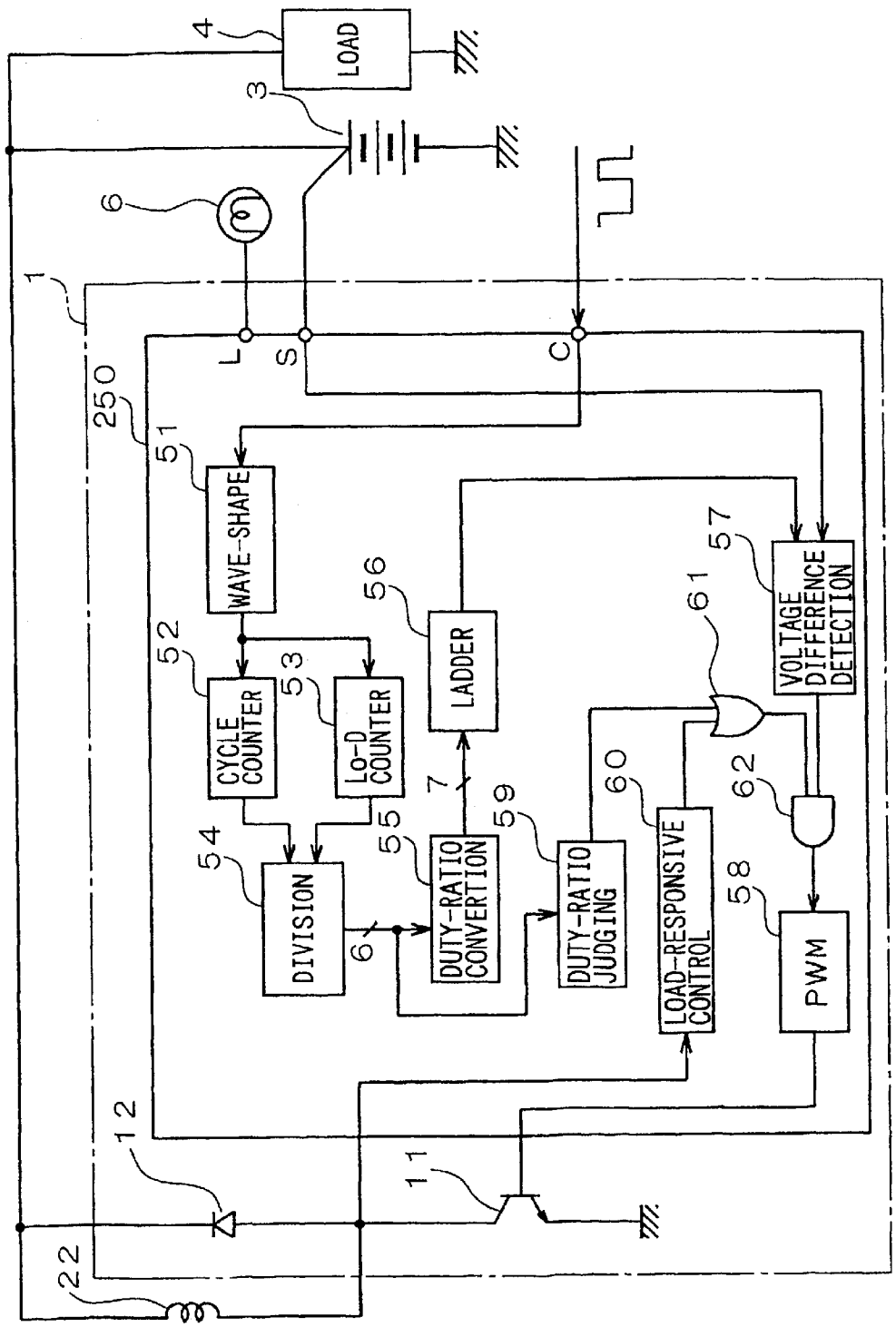
FIG. 19 is a circuit diagram of a generator control unit of a battery charging system according to the third embodiment of the invention.

As shown in FIG. 19, a generator control unit 250 is comprised of the wave-shaping circuit 51, the cycle counter 52, the Lo-duration counter 53, the dividing circuit 54, the duty-ratio converting circuit 55, the ladder circuit 56, the voltage difference detecting circuit 57, the PWM circuit 58, the duty-ratio judging circuit 59, the load-responsive control circuit 60, the OR circuit 61, and the AND circuit 62.

The voltage difference detecting circuit 57 compares any of the above-described reference voltages Vref with the battery voltage that is applied to the S-terminal of the generator control unit 250 and provides a high level or low level signal according to the comparison result. When the voltage difference detection circuit 57 outputs a high level signal, the AND circuit 62 outputs a high level signal, so that the PWM circuit 58 provides a drive signal that has a certain duty-ratio to drive the power transistor 11. When the PWM circuit 58 provides the drive signal, the power transistor 11 is turned on and off to supply current to the field coil 22. Accordingly, the output voltage of the vehicle generator 2, and the terminal voltage of the battery rises up.

Figure 21:
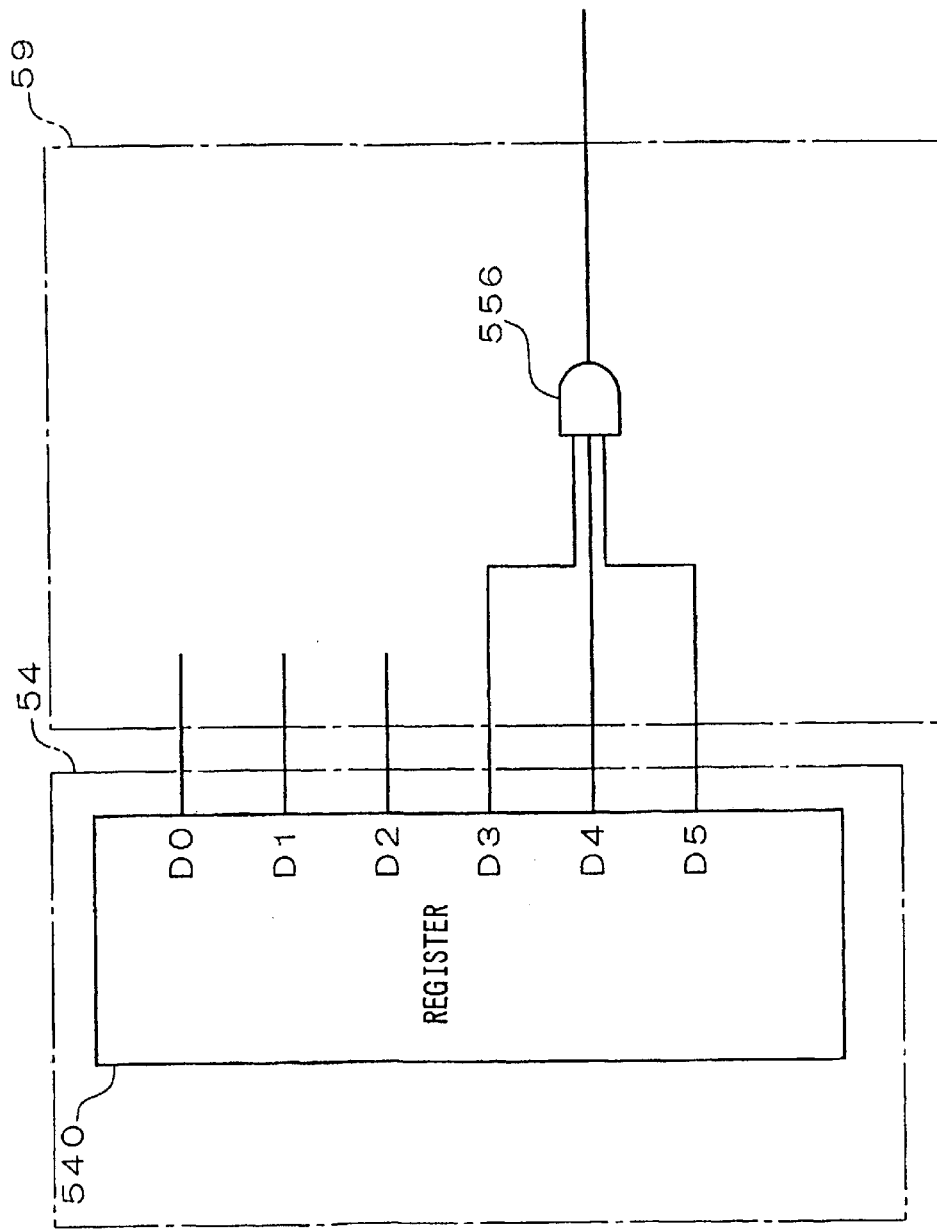
FIG. 21 is a circuit diagram of a duty ratio judging circuit shown in FIG. 19.

As shown in FIG. 21, the duty-ratio judging circuit 59 includes an AND circuit 556. The AND circuit 556 outputs the logical product of the signals of the third bit terminal D3, the fourth bit terminal D4 and the fifth bit terminal D5 of the register 540. In other words, the duty-ratio judging circuit 59 outputs a high level signal when the six-bit data is equal to or more than "56".

The load-responsive control circuit 60 is connected to a junction of the field coil 22 and the power transistor 11. The load-responsive control circuit 60 detects an conduction ratio of the transistor 11 and gradually increases the conduction ratio. The OR circuit 61 has two input terminals that are respectively connected to the duty-ratio judging circuit 59 and the output power limiting circuit 63. When the six-bit data corresponding to the duty-ratio is between "0" and "55", the output signal of the output power limiting circuit 63 is applied to the AND circuit 62 via the OR circuit 61 to have load responsive control. When the six-bit data corresponding to the duty-ratio is between "56" and "63", or when the duty-ratio judging circuit 59 outputs a high level signal, the level of the output signal of the OR circuit 61 is held to be high irrespective of the output signal of the output power limiting circuit 63. In other words, the output terminal of the output power limiting circuit 63 is masked to, thereby, disabling the load-responsive control.

Figure 20:
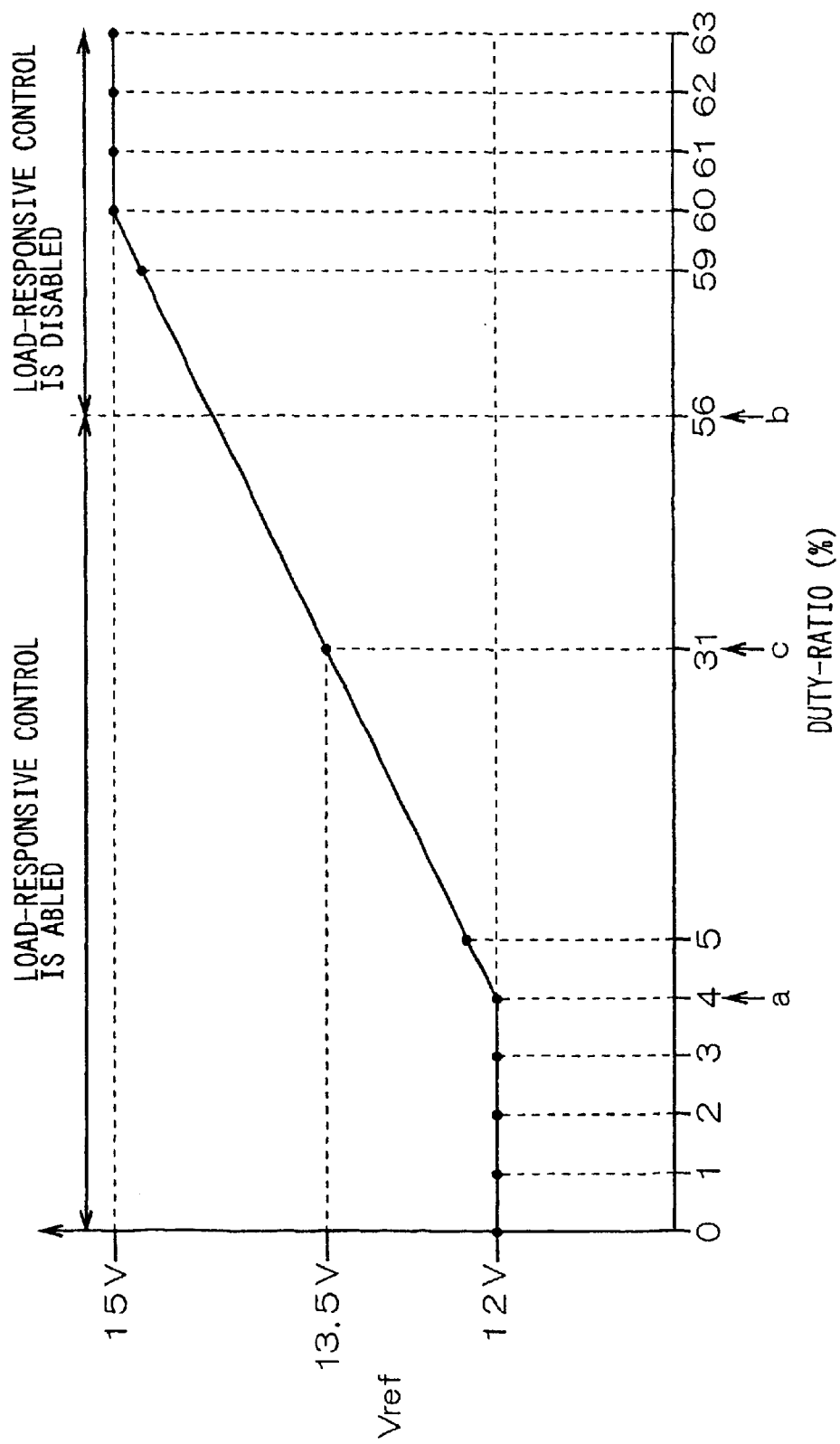
FIG. 20 is a graph showing a relationship between reference voltages and duty ratios of a pulse signal.

The operation of the battery charging system according to the third embodiment is described with reference to a flow diagram shown in FIGS. 20 and 21.

The CPU 81 detects vehicle speed at step 2100, a throttle open angle at step 2101 and the charge condition of the battery 3 at step 2102. The battery charge condition can be estimated by integrating the current charged into or discharged from the battery 3.

The CPU 81 examines whether the vehicle is accelerated or not at step 2103, whether the vehicle is decelerated at step 2104 according to the throttle open angle.

If the vehicle is accelerated, YES is put up at step 2103. Thereafter, the CPU 81 sets the duty-ratio of the command pulse signal at a (e.g. 6.25%) at step 2105, and repeatedly rewrite the content of the register 84 of the I/O circuit 82 so that the duty-ratio becomes a. Then, the command pulse signal is sent to the vehicle generator control unit 1 at step 2106. The vehicle generator control unit 1 converts the duty-ratio (6.25%) into six-bit data "4" and sets the reference voltage at 12 V, thereby regulating the output voltage of the vehicle generator 2. Thus, the output power of the vehicle generator 2 is stopped or limited, so that the engine load can be reduced. This operation enables the load responsive control so that the output voltage of the generator 2 can be controlled to gradually increase even if the reference voltage Vref increases sharply after the vehicle is accelerated. As a result, the engine rotation maintains its stability.

If the vehicle is decelerated, NO is put up at step 2103, and YES is put up at step 2104. Then, the CPU 81 sets the duty-ratio at b (e.g. 93.75%) at step 2107 and repeatedly rewrite the content of the register 84 of the I/O circuit 82 so that the duty-ratio becomes b. Then, the command pulse signal is sent to the vehicle generator control unit 1 at step 2106. The generator control unit 1 converts the duty-ratio (93.75%) of the command pulse signal into six-bit data "60" and sets the reference voltage Vref at 15 V, thereby regulating the output voltage of the vehicle generator 2. Thus, the output power of the vehicle generator 2 is increased so that the kinetic energy of the vehicle can be effectively converted into electric power and charged to the battery 3.

If the vehicle is neither accelerated nor decelerated, NO is put up at step 2104, and the CPU 81 examines whether the charge condition of the battery 3 is normal or not at step 2108. For example, if the battery is charged 95% of its capacity, YES is put up. Subsequently, the CPU 81 sets the duty-ratio of the command pulse signal at c (e.g. 50%) at step 2109. Therefore, the CPU 81 repeatedly rewrites the content of the register 84 of the I/O circuit 82 at predetermined timing so that the duty-ratio becomes such a value and sends the command pulse signal to the vehicle generator control unit 1 at step 2106. The vehicle generator control unit 1 converts the command pulse signal having such a duty-ratio (e.g. 50%) into six-bit data "31" and sets the reference voltage Vref at 13.5 V, thereby regulating the output voltage of the vehicle generator 2. Thus, ideal battery charging can be achieved.

If the charge condition of the battery is not normal or less than 95% of the battery capacity, NO is put up at step 2108, and the CPU 81 sets the duty-ratio of the command pulse signal at a value corresponding to the battery charge condition at step 2110. Therefore, the CPU 81 repeatedly rewrites the content of the register 84 of the I/O circuit 82 at predetermined timing so that the duty-ratio becomes such a value and sends the command pulse signal to the vehicle generator control unit 1 at step 2106.

Suppose that the battery condition is normal, that the duty-ratio of the command pulse signal is 50% and also that the reference voltage Vref is 50%. If the vehicle is decelerated, the ECU 80 changes the duty ratio from 50% to 100%. Because the load responsive control is disabled in this condition, the conduction rate of the power transistor 11 becomes 100% as soon as the reference voltage Vref is changed to 15 V. Accordingly, the output power of the generator sharply increases so that the kinetic energy of the vehicle can be converted into electric energy to be charged into the battery 3. Incidentally, dotted lines in FIG. 23 indicate characteristics of a conventional generator control system in which the load-responsive control is not disabled.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A battery charging system including a battery, a generator for charging said battery and an electric load, a generator control unit for controlling output voltage of said generator and a generator condition commanding unit for providing a generator condition command pulse signal, said generator control unit comprising:
   a duty-ratio detecting means for detecting a duty-ratio of said command pulse signal;
   an output power limiting circuit for limiting output power of said generator;
   a voltage regulator for regulating said output voltage of said generator to a voltage proportional to said duty-ratio; and
   activation means for activating said output power limiting circuit to limit said output power of said generator when said duty-ratio falls within a predetermined ratio range.

2. The battery charging system as claimed in claim 1, wherein
   said predetermined range includes a duty-ratio at which said output voltage is regulated to be minimum.

3. The battery charging system as claimed in claim 1, wherein
said generator control unit comprises a generator's rotation speed detecting circuit, and
said activation means activates said output power limiting circuit to limit output power of said generator if said duty ratio falls in said predetermined ratio range and if said rotation speed falls in a predetermined speed range.

4. The battery charging system as claimed in claim 1, wherein
said generator includes a field coil and an armature winding; and
said output power limiting circuit limits said output power by limiting field current supplied to said field coil.

5. The battery charging system as claimed in claim 4, wherein
said generator includes a field coil and an armature winding;
said voltage regulator includes a power transistor for controlling said field current; and
said output power limiting circuit limits said output power by limiting conduction ratio of said power transistor.

6. The battery charging system as claimed in claim 1, wherein
said battery charging system is mounted in a vehicle that includes an engine and a starter;
said generator comprises a plurality of phase windings;
said output power limiting circuit limits peak voltage of one of said phase winding within battery voltage of said battery when said battery is disconnected and opened.

7. The battery charging system as claimed in claim 1, wherein
said battery charging system is mounted in a vehicle that includes an engine and a starter;
said generator comprises a plurality of phase windings;
said output power limiting circuit limits peak voltage of one of said phase winding within battery voltage of said battery when said engine is started by said battery.

8. The battery charging system as claimed in claim 4, wherein said output power limiting circuit cuts said field current to stop generation of said output power.

9. The battery charging system as claimed in claim 5, wherein
said generator control unit comprises a load responsive control unit for limiting said field current when said generator is connected to said electric load and when said activation means switches said output power limiting circuit from its activating state to deactivating state.

10. A generator control unit for a generator with use of a battery comprising:
a duty-ratio detecting means for detecting a duty ratio of a command pulse signal;
an output power limiting circuit for limiting output power of said generator;
a voltage regulator for regulating said output voltage of said generator to a voltage proportional to said duty-ratio; and
activation means for activating said output power limiting circuit to limit said output power of said generator when said duty-ratio falls within a predetermined ratio range.

11. The generator control unit as claimed in claim 10, further comprising a generator's rotation speed detecting circuit, wherein
said activation means activates said output power limiting circuit to limit output power of said generator if said duty ratio falls in said predetermined ratio range and if said rotation speed falls in a predetermined speed range.

12. The generator control unit as claimed in claim 11, further comprising reference means for providing reference voltage that is proportional to said duty-ratio; wherein
said voltage regulator regulates said output voltage by comparing said reference voltage with terminal voltage of said battery.

13. A battery charging system including a battery, a generator for charging said battery and an electric load, a generator control unit for controlling output voltage of said generator and a generator condition commanding unit for providing a generator condition command pulse signal, said generator control unit comprising:
a duty-ratio detecting means for detecting a duty-ratio of said command pulse signal;
a reference voltage generating means for providing reference voltage that is approximately proportional to said duty-ratio between a maximum value and a minimum value of said duty ratio and is fixed at said maximum and minimum values; and
a voltage regulator including means for comparing said reference voltage with terminal voltage of said battery.

14. The battery charging system as claimed in claim 13, wherein
said reference voltage generating means is disposed where ambient temperature changes relative to temperature of said battery so that said reference voltage can be set according to said ambient temperature when said duty-ratio is in a range near said maximum value or said minimum value.

15. The battery charging system as claimed in claim 13, wherein said generator condition commanding unit comprises:
means for calculating a duty-ratio of said command pulse signal according to at least one of a battery charge condition, a vehicle speed and a throttle valve position in synchronism with a clock signal; and
a pulse signal generator including a switching circuit and means for holding on-off state of said switching circuit; whereby
content of said means for holding is changed by said means for calculating a duty-ratio in synchronism with said clock signal to change said on-off state of said switching circuit, thereby generating said command pulse signal.

16. The battery charging system as claimed in claim 15, wherein
said command pulse signal has a cycle time that is a multiple of a cycle time of said clock signal and is shorter than a time constant of said vehicle generator.

17. The battery charging system as claimed in claim 15, wherein
said reference voltage generating means is disposed where ambient temperature changes relative to temperature of said battery so that said reference voltage can be set according to said ambient temperature when said duty-ratio is in a predetermined range;

said means for calculating a duty ratio sets a duty-ratio of said command pulse signal at a minimum value so that said reference voltage can be minimum when detected that said vehicle is accelerated, to a maximum value so that said reference voltage can be maximum when detected that said vehicle is decelerated and to a value in said predetermined range when detected that said vehicle is not accelerated or decelerated and that said battery is in a state of being charged.

18. A generator control unit comprising:

a duty-ratio detecting means for detecting a duty-ratio of said command pulse signal;

a reference voltage generating means for providing reference voltage that is approximately proportional to said duty-ratio between a maximum value and a minimum value of said duty ratio and is fixed at said maximum and minimum values; and a voltage regulator including means for comparing said reference voltage with terminal voltage of said battery.

19. The generator control unit as claimed in claim 18, wherein said reference voltage generating means is disposed where ambient temperature changes relative to temperature of said battery so that said reference voltage can be set according to said ambient temperature when said duty-ratio is in a range near said maximum value or said minimum value.

20. A battery charging system including a battery, a generator having a field coil for charging said battery and an electric load, a generator control unit for controlling output voltage of said generator and a generator condition commanding unit for providing a generator condition command pulse signal, said generator control unit comprising:

a duty-ratio detecting means for detecting a duty-ratio of said command pulse signal;

a load responsive control circuit for limiting increase of current supplied to said field coil;

a voltage regulator for controlling output voltage of said generator to be proportional to said duty-ratio; and means for disabling said load responsive control circuit from limiting increase if said duty ratio is in a predetermined range.

21. The battery charging system as claimed in claim 20, wherein said predetermined range includes a duty-ratio that makes said voltage regulator control said output voltage of said generator at a maximum voltage.

22. The battery charging system as claimed in claim 20, wherein said generator condition commanding unit comprises:

means for calculating a duty-ratio of said command pulse signal according to at least one of a battery charge condition, a vehicle speed and a throttle valve position in synchronism with a clock signal; and a pulse signal generator including a switching circuit and means for holding on-off state of said switching circuit; whereby content of said means for holding is changed by said means for calculating a duty-ratio in synchronism with said clock signal to change said on-off state of said switching circuit, thereby generating said command pulse signal.

23. The battery charging system as claimed in claim 20, wherein said command pulse signal has a cycle time that is a multiple of a cycle time of said clock signal and is shorter than a time constant of said vehicle generator.

24. A generator control unit comprising:

a duty-ratio detecting means for detecting a duty-ratio of said command pulse signal;

a load responsive control circuit for limiting increase of current supplied to said field coil;

a voltage regulator for controlling output voltage of said generator to be proportional to said duty-ratio; and means for disabling said load responsive control circuit from limiting increase if said duty ratio is in a predetermined range.

25. The generator control system as claimed in claim 24, further comprising a reference voltage generating means for providing reference voltage that is approximately proportional to said duty-ratio, wherein said voltage regulator regulates said output voltage of said generator by comparing said reference voltage with terminal voltage of said battery.

* * * * *